(12) United States Patent
Kachi

(10) Patent No.: US 8,322,843 B2
(45) Date of Patent: *Dec. 4, 2012

(54) INKJET RECORDING APPARATUS AND INKJET RECORDING METHOD

(75) Inventor: Yasuhiko Kachi, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 397 days.

This patent is subject to a terminal disclaimer.

(21) Appl. No.: 12/404,904

(22) Filed: Mar. 16, 2009

(65) Prior Publication Data

US 2009/0231407 A1    Sep. 17, 2009

(30) Foreign Application Priority Data

Mar. 17, 2008   (JP) .................................. 2008-067449

(51) Int. Cl.
*B41J 2/01* (2006.01)

(52) U.S. Cl. ............................ 347/104; 347/101; 347/16

(58) Field of Classification Search .................. 347/101, 347/104, 16, 17, 21; 271/314, 315, 306, 271/3.2

See application file for complete search history.

(56) References Cited

U.S. PATENT DOCUMENTS

| | | | |
|---|---|---|---|
| 5,816,155 A * | 10/1998 | Stephan | ........................ 101/232 |
| 6,120,143 A | 9/2000 | Narushima et al. | |
| 6,378,425 B1 | 4/2002 | Stephan | |
| 7,506,975 B2 * | 3/2009 | Cellura et al. | ................ 347/103 |
| 7,524,005 B2 | 4/2009 | Inoue | |
| 7,722,180 B2 | 5/2010 | Mashima | |
| 7,726,802 B2 | 6/2010 | Morimoto | |
| 2002/0084581 A1 * | 7/2002 | Schaum | ........................ 271/275 |
| 2003/0122915 A1 | 7/2003 | Katoh et al. | |
| 2005/0110857 A1 | 5/2005 | Matsumoto et al. | |
| 2006/0009544 A1 | 1/2006 | Miyagawa et al. | |
| 2007/0008394 A1 * | 1/2007 | Mashima | ...................... 347/104 |
| 2009/0079784 A1 * | 3/2009 | Chiwata et al. | ................. 347/21 |
| 2009/0231377 A1 * | 9/2009 | Kachi | ............................. 347/16 |
| 2009/0244237 A1 * | 10/2009 | Kachi | .......................... 347/102 |

FOREIGN PATENT DOCUMENTS

| | | |
|---|---|---|
| JP | 3-169644 A | 7/1991 |
| JP | 4-18462 A | 1/1992 |
| JP | 8-244206 A | 9/1996 |
| JP | 10-138526 A | 5/1998 |
| JP | 10-202973 A | 8/1998 |
| JP | 2000-168047 A | 6/2000 |
| JP | 2002-292956 A | 10/2002 |

(Continued)

*Primary Examiner* — Matthew Luu
*Assistant Examiner* — Henok Legesse
(74) *Attorney, Agent, or Firm* — Birch, Stewart, Kolasch & Birch, LLP.

(57) ABSTRACT

An inkjet recording apparatus which ejects an ink so as to record an image on a recording medium has: a conveyance device which conveys a recording medium; a liquid deposition device which deposits a liquid onto a recording surface of the recording medium which is conveyed by the conveyance device; an intermediate conveyance body which moves the recording medium in rotation onto the recording surface of which the liquid has been deposited by the liquid deposition device while holding an edge of the recording medium; a conveyance guide which guides a non-recording surface of the recording medium which is moved in rotation by the intermediate conveyance body; and a pressure application device which applies a pressure differential between the recording surface and the non-recording surface of the recording medium which is moved in rotation by the intermediate conveyance body.

15 Claims, 18 Drawing Sheets

FOREIGN PATENT DOCUMENTS

| | | |
|---|---|---|
| JP | 2003-220701 A | 8/2003 |
| JP | 2004-90403 A | 3/2004 |
| JP | 2004-90596 A | 3/2004 |
| JP | 2004/291627 A | 10/2004 |
| JP | 2005-138336 A | 6/2005 |
| JP | 2006-37088 A | 2/2006 |
| JP | 2006-264068 A | 10/2006 |
| JP | 2007-15130 A | 1/2007 |
| JP | 2007-160879 A | 6/2007 |
| JP | 2007-216456 A | 8/2007 |
| JP | 2007-217508 A | 8/2007 |
| JP | 2007-261206 A | 10/2007 |

* cited by examiner

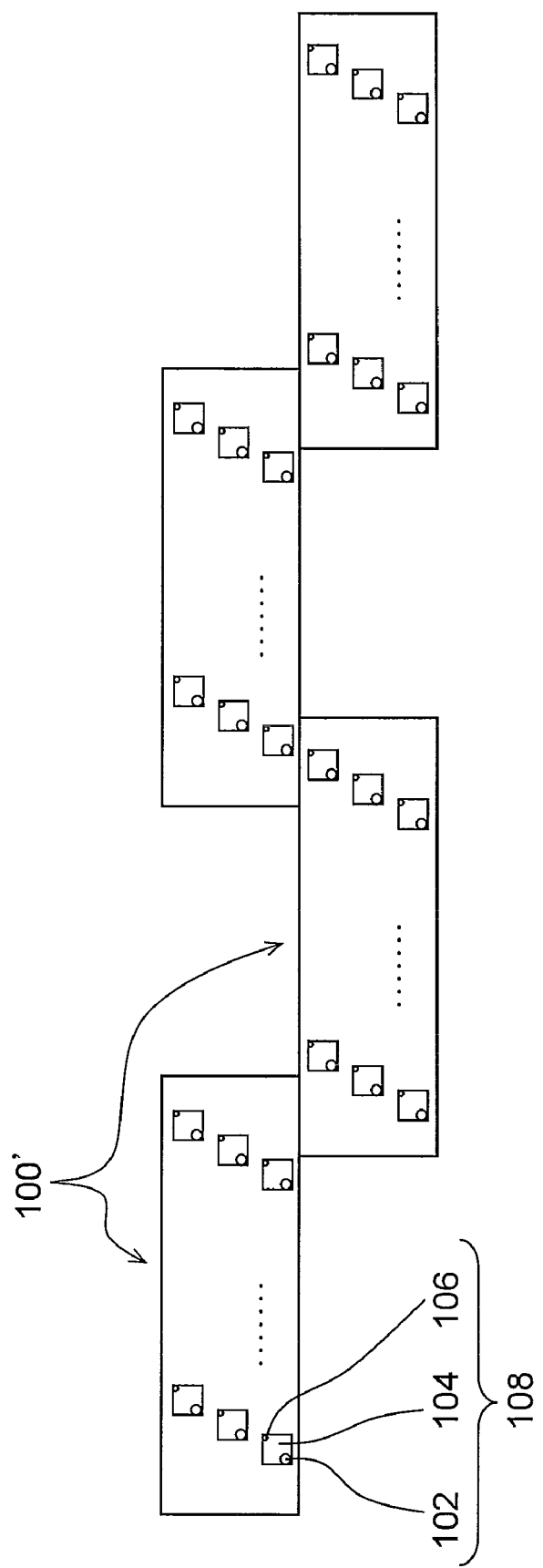

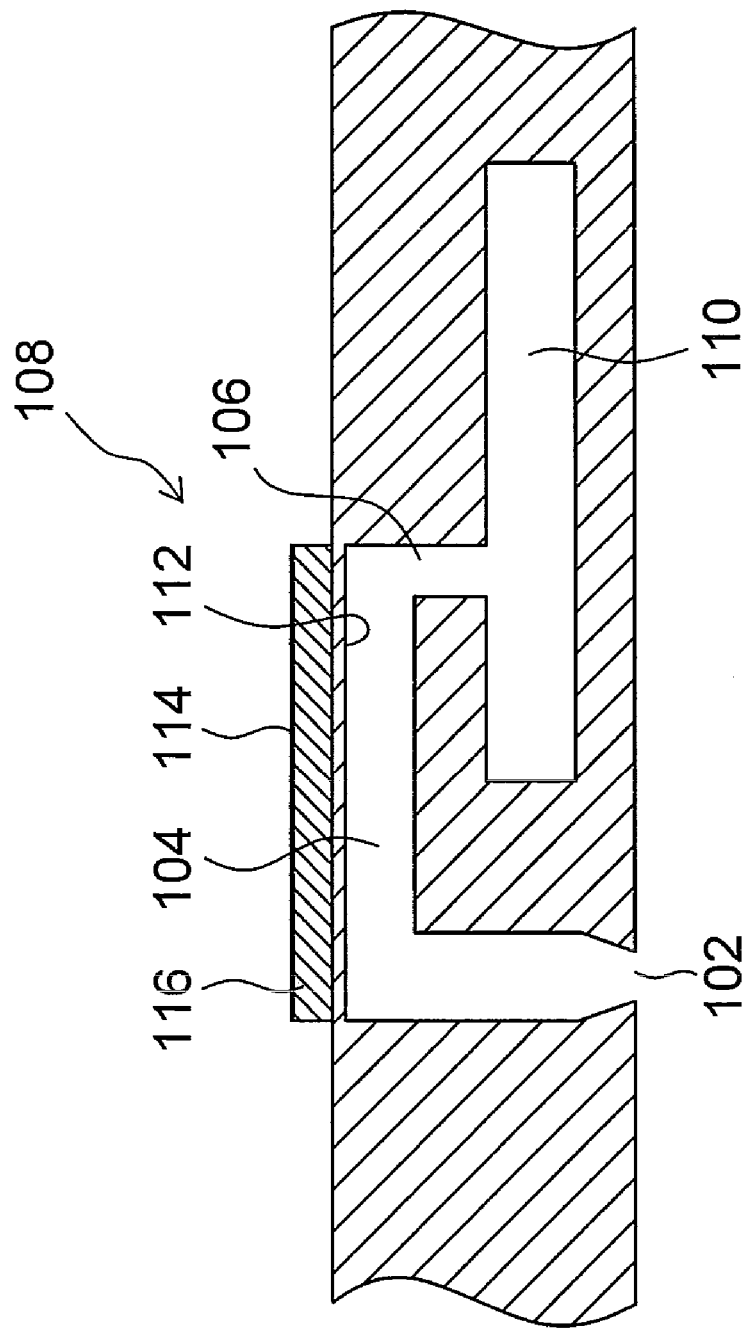

INKJET RECORDING APPARATUS AND INKJET RECORDING METHOD

BACKGROUND OF THE INVENTION

1. Field of the Invention

The present invention relates to an inkjet recording apparatus and an inkjet recording method, and more particularly to an inkjet recording apparatus and an inkjet recording method which promote drying and permeation of the solvent of ink or treatment liquid which has been deposited onto a recording medium, and which promote especially permeation into a recording medium of a high-boiling-point solvent having a boiling point of 100° C. or above.

2. Description of the Related Art

Japanese Patent Application Publication No. 2002-292956 discloses a cut sheet rotary printing machine which comprises a holding apparatus for holding cut sheet paper, a rotatably composed conveyance drum which conveys cut sheet paper, and a NIP (non-impact printing) print head, opposing the conveyance drum, which prints onto the cut sheet paper. After printing onto the cut sheet paper in the conveyance apparatus, the paper is transferred to a chain conveyance apparatus of a cut sheet paper output apparatus.

Japanese Patent Application Publication No. 10-202973 discloses a high-speed image forming apparatus which comprises a drum that is rotatable at a uniform circumferential speed and a gripping hook holding device which is capable of gripping a print medium on the outer circumferential side of the drum, wherein a print medium is gripped on the outer circumferential side of the drum by the gripping hook holding device and recording is performed onto the print medium by an inkjet recording head. After printing onto the print medium which has been held on the outer circumferential side of the drum, the print medium is separated from the drum without carrying out drying, and is conveyed and output in a state where the recording surface of the print medium lies in contact with a pressing belt conveyor.

However, Japanese Patent Application Publication No. 2002-292956 does not disclose the drying of the print image or the drying of the ink.

Japanese Patent Application Publication No. 10-202973 does not disclose a drying unit, and when the recording medium which has been recorded on the drum is output after being separated from the drum, the recording surface of the print medium makes contact with the pressing belt conveyor and hence there is a possibility of the occurrence of image defects.

Here, when an image is formed on the recording medium by the inkjet recording head, the non-aqueous solvent (a solvent other than water) which is contained in the treatment liquid remains on the recording medium, and when ink droplets are ejected in this state, the coloring material in the ink flows on the recording medium, image non-uniformities occur and there is a possibility of decline in the quality of the image. Furthermore, when an image is formed by depositing inks of a plurality of colors, such as cyan (C), magenta (M), yellow (Y), black (K), or the like, then there is a possibility of decline in the quality of the image due to the occurrence of color mixing.

Moreover, if the image is fixed in a state where the non-aqueous solvent contained in the ink remains on the recording medium, then the fixing properties decrease and there is a possibility of decline in the quality of the image. In particular if using a recording medium having a low permeation rate (coated printing paper, or the like) in which the speed of permeation of the non-aqueous solvent is slow, then the fixing properties decrease and there is a possibility of decline in the quality of the image.

On the other hand, if a drying or curing device is arranged to the downstream side of the ink head over the print drum, then the print drum is heated, the meniscus in the ink head is dried and cured, and there is a possibility that ejection failures may occur in the ink head.

SUMMARY OF THE INVENTION

The present invention has been contrived in view of these circumstances, an object thereof being to provide an inkjet recording apparatus and an inkjet recording method whereby image quality is improved by promoting the permeation of non-aqueous solvent contained in the treatment liquid or ink which has been deposited onto a recording medium.

In order to attain an object described above, one aspect of the present invention is directed to an inkjet recording apparatus which ejects an ink so as to record an image on a recording medium, the inkjet recording apparatus comprising: a conveyance device which conveys a recording medium; a liquid deposition device which deposits a liquid onto a recording surface of the recording medium which is conveyed by the conveyance device; an intermediate conveyance body which moves the recording medium in rotation onto the recording surface of which the liquid has been deposited by the liquid deposition device while holding an edge of the recording medium; a conveyance guide which guides a non-recording surface of the recording medium which is moved in rotation by the intermediate conveyance body; and a pressure application device which applies a pressure differential between the recording surface and the non-recording surface of the recording medium which is moved in rotation by the intermediate conveyance body.

According to this aspect of the invention, it is possible to promote the permeation into the recording medium of a non-aqueous solvent of the liquid on the recording surface of the recording medium which has been deposited by the liquid deposition device. Here, the non-aqueous solvent is a solvent other than water.

Desirably, the pressure application device is a negative pressure application device which is provided in the conveyance guide and applies a negative pressure to the non-recording surface of the recording medium.

According to this aspect of the invention, by applying the negative pressure, it is possible to promote the permeation into the recording medium of the non-aqueous solvent in the liquid on the recording surface of the recording medium which has been deposited by the liquid deposition device.

Desirably, the inkjet recording apparatus comprises a negative pressure control device which controls the negative pressure applied by the negative pressure application device.

According to this aspect of the invention, by controlling the negative pressure applied, it is possible efficiently to promote the permeation into the recording medium of the non-aqueous solvent in the liquid on the recording surface of the recording medium which has been deposited by the liquid deposition device.

Desirably, the negative pressure control device controls the negative pressure in accordance with a type of the recording medium.

According to this aspect of the invention, since the permeation into the recording medium of the non-aqueous solvent in the liquid deposited on the recording medium is promoted in accordance with the type of recording medium, then it is possible to achieve compatibility with the general properties of the recording medium.

Desirably, the negative pressure control device controls the negative pressure in accordance with at least one of a thickness of the recording medium and a porosity of the recording medium.

According to this aspect of the invention, the permeation into the recording medium of the non-aqueous solvent of the liquid which has been deposited on the recording medium is promoted in accordance with at least one of the thickness of the recording medium and the porosity of the recording medium, and therefore it is possible to achieve compatibility with the general properties of the recording medium.

Desirably, the pressure application device is a positive pressure application device which is provided in the intermediate conveyance body and applies a positive pressure to the recording surface of the recording medium.

According to this aspect of the invention, by applying the positive pressure, it is possible to promote the permeation into the recording medium of the non-aqueous solvent in the liquid on the recording surface of the recording medium which has been deposited by the liquid deposition device.

Desirably, the inkjet recording apparatus comprises a positive pressure control device which controls the positive pressure applied by the positive pressure application device.

According to this aspect of the invention, by controlling the positive pressure applied, it is possible efficiently to promote the permeation into the recording medium of the non-aqueous solvent in the liquid on the recording surface of the recording medium which has been deposited by the liquid deposition device.

Desirably, the positive pressure control device controls the positive pressure in accordance with a type of the recording medium.

According to this aspect of the invention, since the permeation into the recording medium of the non-aqueous solvent in the liquid deposited on the recording medium is promoted in accordance with the type of recording medium, then it is possible to achieve compatibility with the general properties of the recording medium.

Desirably, the positive pressure control device controls the positive pressure in accordance with at least one of a thickness of the recording medium and a porosity of the recording medium.

According to this aspect of the invention, the permeation into the recording medium of the non-aqueous solvent of the liquid which has been deposited on the recording medium is promoted in accordance with at least one of the thickness of the recording medium and the porosity of the recording medium, and therefore it is possible to achieve compatibility with the general properties of the recording medium.

Desirably, the positive pressure application device comprises a positive pressure restricting device which partially restricts the positive pressure applied to the recording surface of the recording medium.

According to this aspect of the invention, the permeation into the recording medium of the non-aqueous solvent of the liquid on the recording surface of the recording medium is promoted more reliably.

Desirably, the positive pressure application device comprises an air blowing aperture which blows an air flow onto the recording surface of the recording medium.

According to this aspect of the invention, the permeation into the recording medium of the non-aqueous solvent of the liquid on the recording surface of the recording medium is promoted by blowing an air flow from the air blowing aperture.

Desirably, the positive pressure control device controls at least one of a temperature and a flow rate of the air flow blown from the air blowing aperture in accordance with an amount of high-boiling-point solvent which has been deposited onto the recording surface of the recording medium.

According to this aspect of the invention, the viscosity of the high-boiling-point non-aqueous solvent is lowered and the permeation thereof into the recording medium is promoted.

Desirably, the liquid deposition device is a treatment liquid deposition device which deposits a treatment liquid onto the recording surface of the recording medium which is conveyed by the conveyance device.

According to this aspect of the invention, it is possible to promote the permeation of the non-aqueous solvent of the treatment liquid into the recording surface of the recording medium.

Desirably, the liquid deposition device is an inkjet head which deposits the ink onto the recording surface of the recording medium which is conveyed by the conveyance device.

According to this aspect of the invention, it is possible to promote the permeation of the non-aqueous solvent of the ink into the recording surface of the recording medium.

In order to attain an object described above, another aspect of the present invention is directed to an inkjet recording method of ejecting an ink so as to record an image on a recording medium, the inkjet recording method comprising the step of applying a pressure differential between a recording surface and a non-recording surface of the recording medium onto the recording surface of which a liquid has been deposited, when the recording medium is moved in rotation while an edge of the recording medium is held in a state where the non-recording surface of the recording medium is guided.

According to the present invention, it is possible to improve image quality by promoting the permeation of a non-aqueous solvent contained in a treatment liquid or an ink that has been deposited onto the recording medium.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 8 is a plan diagram illustrating a further example of the composition of a head;

FIG. 9 is a cross-sectional view along line 9-9 in FIGS. 7A and 7B;

DETAILED DESCRIPTION OF THE PREFERRED EMBODIMENTS

Ink Set

Figure 1:
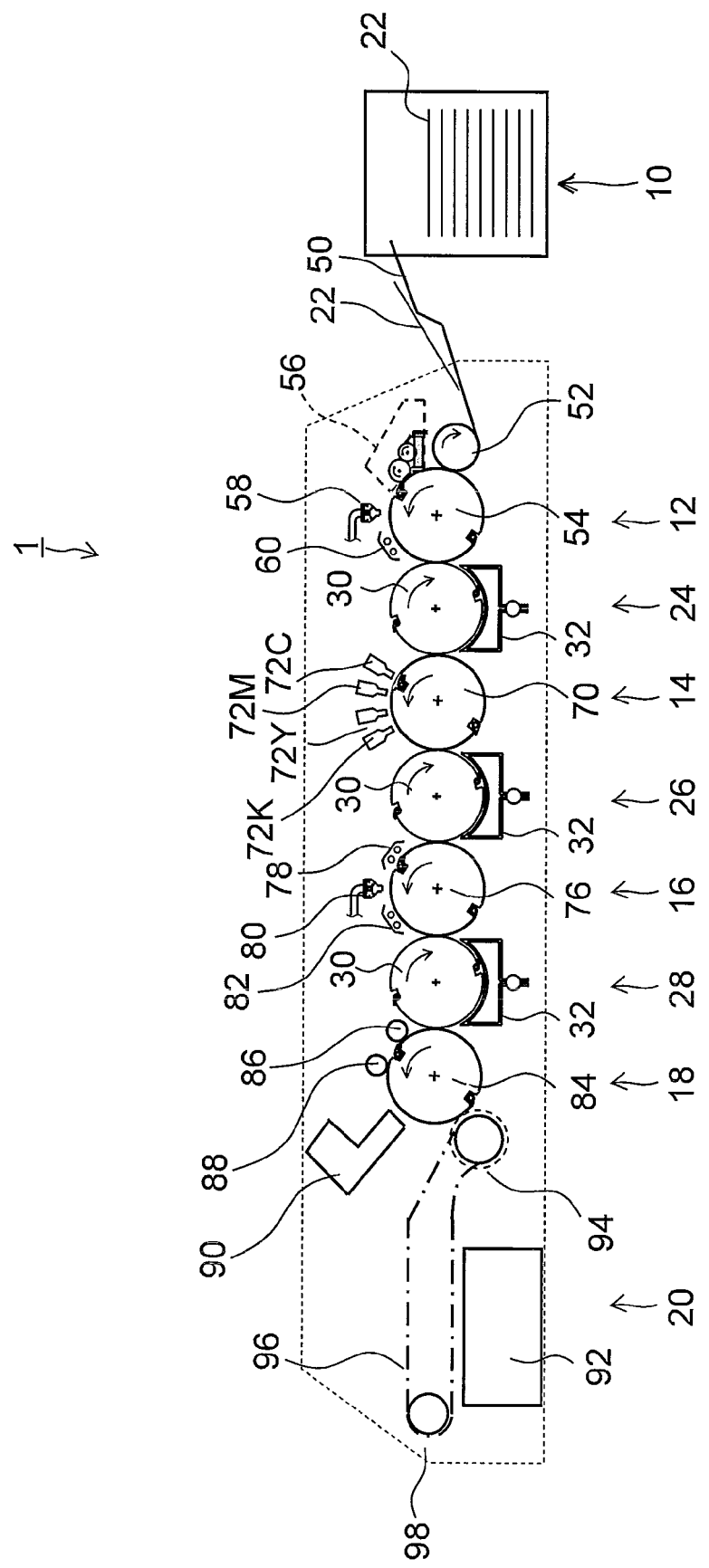
FIG. 1 is a general schematic drawing of an inkjet recording apparatus according to a first embodiment of the invention.

Ink set used in embodiments of the present invention mainly includes: an ink containing at least a water-soluble solvent, water, and pigment particles dispersed and kept in the medium; and a treatment liquid which is a liquid that does not contain a coloring material and which contains at least a high-boiling-point organic solvent of 5 wt %-60 wt %, water and a liquid composition improving image resolution properties.

Ink

For an ink used in embodiments of the present invention, it is possible to use a water-soluble pigment-based ink which contains, as solvent-insoluble materials, a pigment which is a coloring material (colorant) and polymer micro-particles and the like.

Desirably, the density of the solvent-insoluble material is equal to or greater than 1 wt % and equal to or less than 20 wt %, taking account of the fact that the suitable viscosity for ejection is 20 mPa·s or lower. More desirably, the density of the pigment is 4 wt % or above, in order to obtain good optical density in the image.

Desirably, the surface tension of the ink is equal to or greater than 20 mN/m and equal to or less than 40 mN/m, taking account of ejection stability.

The coloring material used in the ink may be pigment particles or a combination of dye and pigment. From the viewpoint of the aggregating properties upon contact with the treatment liquid, a pigment which is in a dispersed state in the ink is desirable, since this aggregates more effectively. Of pigments, it is particularly desirable to use a pigment which is dispersed by a dispersant, a self-dispersing pigment, a pigment in which the surfaces of the pigment particles are covered with a resin (microcapsule pigment), or a polymer grafted pigment. Furthermore, from the viewpoint of the aggregating properties of the pigment, a more desirable mode is one where the pigment is modified with a carboxyl group having a low degree of disassociation.

There are no particular restrictions on the resin used in a microcapsule pigment, but it is desirable to use a polymer compound having self-dispersing properties or solubility in water, and having an anionic group (acidic properties). Normally, this resin desirably has a numerical average molecular weight in the range of approximately 1,000 to 100,000, and particularly desirably, in the range of approximately 3,000 to 50,000. Furthermore, desirably, the resin is formed as a solution by dissolving in an organic solvent. By setting the numerical average molecular weight of the resin to this range, it is possible to display a satisfactory function as a coating film in the pigment, or as a coating film in the ink composition.

It is possible for the resin to be self-dispersing or soluble, or for these functions to be imparted to the polymer by means of some kind. For example, it is possible to use a resin in which an anionic group such as a carboxyl group, a sulfonate group, a phosphonate group, or the like, has been introduced, by neutralizing with an organic amine or alkali metal. Moreover, it is also possible to use a resin in which one or two or more of the same anionic group or different anionic groups has been introduced. In embodiments of the present invention, it is desirable to use a resin in which a carboxyl group is introduced by neutralizing with a base.

There are no particular restrictions on the pigment used, but possible specific examples of an orange or yellow pigment are, for instance: C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180, C.I. Pigment Yellow 185, and the like. Possible examples of a red or magenta pigment are, for instance: C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222, and the like.

Possible examples of a green or cyan pigment are, for instance: C.I. Pigment Blue 15, C.I. Pigment Blue 15:2, C.I. Pigment Blue 15:3, C.I. Pigment Blue 16, C.I. Pigment Blue 60, C.I. Pigment Green 7, and the like.

Furthermore, possible examples of a black pigment are, for instance: C.I. Pigment Black 1, C.I. Pigment Black 6, C.I. Pigment Black 7, and the like.

Desirably, as a component which reacts with the treatment liquid, polymer micro-particles which do not contain a colorant are added to a coloring ink liquid. The polymer micro-particles enhance the aggregating action and viscosity increasing action of the ink upon reaction with the treatment liquid, and thereby make it possible to improve the image quality. In particular, it is possible to obtain an ink having high stability by including anionic polymer micro-particles in the ink.

By using polymer micro-particles which produce a viscosity increasing action and aggregating action upon reaction with the treatment liquid, it is possible to improve image quality, while at the same time, depending on the type of polymer micro-particles used, beneficial effects are obtained in further improving the weatherproofing and waterproofing properties of the image due to the polymer micro-particles forming a coating on the recording medium.

The method of dispersing in a polymer ink is not limited to an emulsion, and it may be present in the state of a solution or in the state of a colloidal dispersion.

The polymer micro-particles may be dispersed by using an emulsifier, or without using an emulsifier. For the emulsifier, generally, a surfactant of low molecular weight is used, but it is also possible to use a surfactant of high molecular weight as the emulsifier. It is also desirable to use capsule type polymer micro-particles in which the outer shell is made of acrylic acid, methacrylic acid, or the like (namely, core—shell type polymer micro-particles which have a different composition between the central portion and the outer edge portion).

As the dispersion method, polymer micro-particles which do not use a low-molecular weight surfactant include polymer micro-particles using a high-polymer surfactant and polymer micro-particles which do not include an emulsifier, and these are known as a soap-free latex. For example, this includes polymer micro-particles which use, as an emulsifier, a polymer having a group which is soluble in water, such as a sulfonate group, a carboxylic acid group, or the like, as described above (a polymer with a grafted soluble group, or a block polymer obtained from a monomer having a soluble group and a monomer having an insoluble part).

In particular, it is desirable to use a soap-free latex, since compared to polymer micro-particles which are polymerized using a conventional emulsifier, a soap-free latex avoids concerns such as the emulsifier obstructing the reaction aggregation and film formation of the polymer micro-particles, and the separated emulsifier moving to the surface after the formation of a film of the polymer micro-particles and reducing the adhesiveness between the aggregate body formed by the combined pigment and polymer micro-particles and the recording medium.

Possible examples of a resin component which is added to the ink in the form of polymer micro-particles include: an acrylic resin, a vinyl acetate resin, a styrene-butadiene resin, a vinyl chloride resin, an acryl-styrene resin, a butadiene resin, a styrene resin, and the like.

A material having a carboxylic acid group with a low degree of disassociation is more desirable, from the viewpoint of imparting fast aggregating properties to the polymer micro-particles. Since the carboxylic acid group is liable to be affected by change in the pH, the state of dispersion is liable to change, and hence the aggregating properties are high.

The change in the state of dispersion of the polymer micro-particles caused by change in the pH can be adjusted by means of the content ratio of the constituent components of the polymer micro-particles which contain a carboxylic acid group, such as ester acrylate, or the like, and it can also be adjusted by means of an anionic surfactant which is used as a dispersant.

Desirably, the resin component of the polymer micro-particles is a polymer which combines a hydrophilic part and a hydrophobic part. By incorporating a hydrophobic part, the hydrophobic part is oriented toward to the inner side of the polymer micro-particle, and the hydrophilic part is oriented efficiently toward the outer side, thereby having the effect of further increasing the change in the dispersion state caused by change in the pH of the liquid. Therefore, aggregation can be performed more efficiently.

Desirably, a carboxylic acid polymer is used as an acid polymer.

Since the pKa of carboxylic acid is approximately 3 to 4, then if the pH is 5, the acid polymer assumes an almost separated state and therefore has stable dispersion characteristics due to electric repulsion, and aggregation does not occur. If the pH is lower than this, then the polymer assumes a non-separated state, the electric repulsion is lost and aggregation arises.

Examples of commercial polymer micro-particles include: Joncryl 537, 7640 (a styrene-acrylic resin emulsion, made by Johnson Polymer Corp.), Microgel E-1002, E-5002 (a styrene-acrylic resin emulsion, made by Nippon Paint Co., Ltd.), Boncoat 4001 (an acrylic resin emulsion, made by DIC Corporation), Boncoat 5454 (a styrene-acrylic resin emulsion, made by DIC Corporation), SAE-1014 (a styrene-acrylic resin emulsion, made by Zeon Corporation), Jurymer ET-410, FC-30, (an acrylic resin emulsion, made by Nihonjunyaku Co., Ltd.), Aron HD-5, A-104 (an acrylic resin emulsion, made by Toagosei Co., Ltd.), Saibinol SK-200 (an acrylic resin emulsion, made by Saiden Chemical Industry Co., Ltd.), "Zaicsen" L, (an acrylic resin emulsion, made by Sumitomo Seika Chemicals Co., Ltd.), and the like, but the polymer micro-particles are not limited to these products.

The weight ratio of the added amount of polymer micro-particles with respect to the pigment is desirably from 2:1 to 1:10, and more desirably, from 1:1 to 1:3. If the weight ratio of the added amount of polymer micro-particles with respect to the pigment is smaller than 2:1, then the aggregating force of the aggregate body is not increased effectively by the fusion of the resin. Moreover, even if the added amount is greater than 1:10, the viscosity of the ink becomes too high and the ejection reliability and other factors deteriorate.

In view of the adhesive force when the polymer micro-particles fuse, it is desirable that the molecular weight of the polymer micro-particles added to the ink should be 5,000 or greater. If the molecular weight is less than 5,000, then insufficient effects are obtained in increasing the internal aggregating force of the ink aggregate body when aggregation occurs, or improving the fixing properties of the image to the recording medium, and furthermore, the effects in improving image quality are inadequate.

Desirably, the volume-average particle size (diameter) of the polymer micro-particles is in the range of 10 nm to 1 μm, more desirably, the range of 10 to 500 nm, even more desirably, the range of 20 to 200 nm, and particularly desirably, the range of 50 to 200 nm. If the particle size is less than 10 nm, then significant effects in improving the image quality or enhancing transfer characteristics cannot be expected, even if aggregation occurs. If the particle size is equal to or greater than 1 μm, then there is a possibility that the ejection characteristics from the ink head or the storage stability deteriorate. Furthermore, there are no particular restrictions on the volume-average particle size distribution of the polymer particles; therefore, they may have a broad volume-average particle size distribution, or they may have a mono-disperse volume-average particle size distribution.

Moreover, two or more types of polymer micro-particles may be used in combination in the ink.

It is possible to use an organic salt or an inorganic alkaline base as a neutralizing pH adjuster which is added to the ink. Desirably, a pH adjuster is added so as to adjust the ink to a pH of 6 to 10, in order to improve the storage stability of the inkjet ink.

The water-soluble high-boiling-point organic solvent having an SP value of 30 or lower is contained at a rate of 10 wt % to 90 wt % with the object of preventing blockages of the nozzles of the inkjet head due to drying. A water-soluble high-boiling-point organic solvent of this kind includes a moistening agent or a penetrating agent. Similarly to the case of the treatment liquid, water-soluble high-boiling-point organic solvents having an SP value of 30 or lower include, for instance:

diethylene glycol monoethyl ether (22.4),
diethylene glycol monobutyl ether (21.5),
triethylene glycol monobutyl ether (21.1),
dipropylene glycol monomethyl ether (21.3),
and dipropylene glycol (27.2).

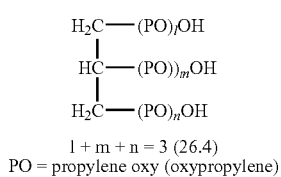

[Chemical Formula 1]

l + m + n = 3 (26.4)
PO = propylene oxy (oxypropylene)

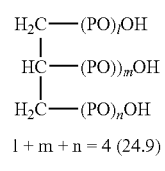

[Chemical Formula 2]

l + m + n = 4 (24.9)

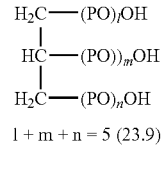

[Chemical Formula 3]

l + m + n = 5 (23.9)

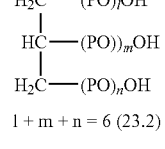

[Chemical Formula 4]

l + m + n = 6 (23.2)

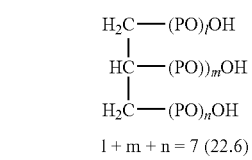

[Chemical Formula 5]

l + m + n = 7 (22.6)

$nC_4H_9O(AO)_4$—H (AO = EO or PO, ratio 1:1)(20.1)

EO = ethylene oxy (oxyethylene)

$nC_4H_9O(AO)_{10}$—H (as above) (18.8)

$HO(A'O)_{40}$—H (A'O = EO or PO, ratio EO:PO = 1:3) (18.7)

$HO(A''O)_{55}$—H (A''O = EO or PO, ratio EO:PO = 5:6) (18.8)

$HO(PO)_3H$ (24.7)

$HO(PO)_7H$ (21.2)

1,2 hexanediol (27.4)

The numbers in parenthesis indicate SP values.

Furthermore, of the solvents having a low SP value, it is desirable to include the following structure.

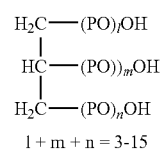

[Chemical Formula 6]

l + m + n = 3-15

The above are possible examples.

The ink may also contain a surfactant. Desirable examples of the surfactant are: in a hydrocarbon system, an anionic surfactant, such as a salt of a fatty acid, an alkyl sulfate ester, an alkyl benzene sulfonate, an alkyl naphthalene sulfonate, a dialkyl sulfosuccinate, an alkyl phosphate ester, a naphthalene sulfonate/formalin condensate, a polyoxyethylene alkyl sulfuric ester, and the like; and a non-ionic surfactant, such as a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerine fatty acid ester, an oxyethylene oxypropylene block copolymer, and the like. Furthermore, it is also desirable to use SURFYNOLS (Air Products & Chemicals, Inc.), which is an acetylene-based polyoxyethylene oxide surfactant. Furthermore, an amine oxide type of amphoteric surfactant, such as N,N-dimethyl-N-alkyl amine oxide, is also desirable.

Moreover, it is also possible to use the surfactants described in pages "(37)" to "(38)" of the Japanese Patent Application Publication No. 59-157636 or Research Disclosure No. 308119 (1989). Furthermore, it is also possible to use a fluorine (alkyl fluoride) type, or silicone type of surfactant such as those described in Japanese Patent Application Publication No. 2003-322926, Japanese Patent Application Publication No. 2004-325707, and Japanese Patent Application Publication No. 2004-309806. It is also possible to use a surface tension adjuster of this kind as an anti-foaming agent; and a fluoride or silicone compound, or a chelating agent, such as EDTA, can also be used.

By reducing the surface tension, it is possible to improve the wetting properties on the layer of solid or semi-solid aggregating treatment liquid, and thus to increase the rate of spreading.

More desirably, the surface tension of the ink is 15 to 45 mN/m, from the viewpoint of simultaneously achieving good wetting properties on an intermediate transfer medium when recording by an intermediate transfer method, as well as finer size of the liquid droplets and good ejection characteristics.

Desirably, the ink viscosity is 1.0 to 20.0 cP.

Additionally, according to requirements, it is also possible to add a pH buffering agent, an antioxidant, an anti-rusting agent, a mildewcide, a viscosity adjuster, a conducting agent, an ultraviolet absorber, or the like.

Explanation of Treatment Liquid (Aggregation Treatment Liquid)

The preferred treatment liquid used in the first embodiment of the present invention causes aggregation of the pigment and polymer microparticles contained in the ink by changing the pH of the ink, and produces aggregates thereof. By using a treatment liquid of this kind, the image resolution properties are improved.

Components of the treatment liquid are preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acids, orthophosphoric acid, pyrrolidonecarboxylic acid, pyronecarboxylic acid, pyrrolecarboxylic acid, faranecarboxylic acid, pyridinecarboxylic acid, coumaric acid, thiophenecarboxylic acid, nicotinic acid, or derivatives of these compounds, or salts thereof.

A treatment liquid having added thereto a polyvalent metal salt or a polyallylamine is the preferred examples of the treatment liquid. The aforementioned compounds may be used individually or in combinations of two or more thereof.

From the standpoint of aggregation ability with the ink, the treatment liquid preferably has a pH of 1 to 6, more preferably a pH of 2 to 5, and even more preferably a pH of 3 to 5.

The amount of the component that causes aggregation of the pigment and polymer particles of the ink in the treatment liquid is preferably not less than 0.01 wt % and not more than 20 wt % based on the total weight of the liquid. Where the amount of this component is less than 0.01 wt %, sufficient concentration diff-usion does not proceed when the treatment liquid and ink come into contact with each other, and sufficient aggregation action caused by pH variation sometimes does not occur. Further, where the amount of this component is more than 20 wt %, the ejection ability from the inkjet head can be degraded.

From the standpoint of preventing the nozzles of inkjet heads from being clogged by the dried ink, it is preferred that the treatment liquid include an organic solvent capable of dissolving water and other additives. A wetting agent and a penetrating agent are included in the organic solvent capable of dissolving water and other additives.

The solvents can be used individually or in a mixture of plurality thereof together with water and other additives.

The content ratio of the organic solvent capable of dissolving water and other additives is preferably not more than 60 wt % based on the total weight of the treatment liquid. Where this amount is higher than 60 wt %, the viscosity of the treatment liquid increases and ejection ability from the inkjet head can be degraded.

In order to improve fixing ability and abrasive resistance, the treatment liquid may further include a resin component. Any resin component may be employed, provided that the ejection ability from a head is not degraded when the treatment liquid is ejected by an inkjet system and also provided that the treatment liquid will have high stability in storage. Thus, water-soluble resins and resin emulsions can be freely used.

An acrylic resin, a urethane resin, a polyester, a vinyl resin, and a styrene resin can be considered as the resin components. In order to demonstrate a sufficient function of improving the fixing ability, a polymer with a comparatively high molecular weight has to be added at a high concentration of 1 wt % to 20 wt %. However, where such a material is added to and dissolved in a liquid, the viscosity thereof increases and ejection ability is degraded. A latex can be effectively added as an adequate material that can be added to a high concentration, while inhibiting the increase in viscosity. Examples of latex materials include alkyl acrylate copolymers, carboxy-modified SBR (styrene-butadiene latex), SIR (styrene-isoprene) latex, MBR (methyl methacrylate-butadiene latex), and NBR (acrylonitrile-butadiene latex). From the standpoint of the process, in order to improve both the stability during storage at normal temperature and the transferability after heating, while ensuring a strong effect during fixing, it is preferred that the glass transition temperature Tg of the latex be not lower than 50° C. and not higher than 120° C. Furthermore, from the standpoint of the process, in order to obtain sufficient fixing at a low temperature, while ensuring a strong effect during fixing, it is preferred that the minimum film-formation temperature MFT be not higher than 100° C., more preferably not higher than 50° C.

The aggregation ability may be further improved by introducing polymer microparticles of reverse polarity with respect to that of the ink into the treatment liquid and causing the aggregation of the pigment contained in the ink with the polymer microparticles.

The aggregation ability may be also improved by introducing a curing agent corresponding to the polymer microparticle component contained in the ink into the treatment liquid, bringing the two liquids into contact, causing aggregation and also crosslinking or polymerization of the resin emulsion in the ink component.

The treatment liquid can include a surfactant.

Examples of suitable surfactants of a hydrocarbon system include anionic surfactants such as fatty acid salts, alkylsulfuric acid esters and salts, alkylbenzenesulfonic acid salts, alkylnaphthalenesulfonic acid salts, dialkylsulfosuccinic acid salts, alkylphosphoric acid esters and salts, naphthalenesulfonic acid formalin condensate, and polyoxyethylene alkylsulfuric acid esters and salts, and nonionic surfactants such as polyoxyethyelene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymer. It is preferred that SURFYNOLS (manufactured by Air Products & Chemicals Co., Ltd.), which is an acetylene-type polyoxyethylene oxide surfactant, be used. Aminoxide-type amphoteric surfactants such as N,N-dimethyl-N-alkylamineoxide is also a preferred surfactant.

A surfactant described in Japanese Patent Application Publication No. 59-157636, pages 37 to 38 and Research Disclosure No. 308119 (1989) can be also used. Fluorine-containing (fluorinated alkyl system) and silicone-type surfactants such as described in Japanese Patent Application Publication Nos. 2003-322926, 2004-325707, and 2004-309806 can be also used. These surface tension adjusting agents can be also used as an antifoaming agent. Chelating agents represented by fluorine-containing or silicone-type compounds and EDTA can be also used.

These agents are effective in reducing surface tension and increasing wettability on the image formation body (recording medium, intermediate transfer body, etc.). Further, even when the ink is the first to be deposited, effective aggregation action proceeds because of increased wettability of the ink and enlarged contact surface area of the two liquids.

The surface tension of the treatment liquid in accordance with the present invention is preferably 10 mN/m to 50 mN/m. From the standpoint of improving the wettability on the intermediate transfer body and also size reduction ability and ejection ability of droplets, it is even more preferred that the surface tension be 15 mN/m to 45 mN/m.

The viscosity of the treatment liquid in accordance with the present invention is preferably 1.0 cP to 20.0 cP.

If necessary, a pH buffer agent, an antioxidant, an anti-mold agent, a viscosity adjusting agent, an electrically conductive agent, an ultraviolet agent, and (ultraviolet) absorbent, etc. can be also added.

Next, examples of a high-boiling-point organic solvent contained in the treatment liquid are shown together with the SP values. In cases where the treatment liquid contains such a high-boiling-point organic solvent, the viscosity of the treatment liquid is increased, and the amount of treatment agent on the surface of the recording medium can be increased.

GP-250 (SP value: 25)
50-HB-200 (SP value: 21)
Diethylene glycol monoethyl ether (SP value: 22.4)
Diethylene glycol monobutyl ether (SP value: 21.5)
1,2 hexanediol (SP value: 27.4)
Dipropylene glycol (SP value: 27.2)
Tri-propylene glycol (SP value: 24.74)
Tri-ethylene glycol monobutyl ether (SP value: 21.1)
Diethylene glycol (SP value: 31.7)

A high-boiling-point organic solvent contained in the treatment liquid used in embodiments of the invention is not limited to the above.

First Embodiment

General Structure of Inkjet Recording Apparatus

First, the general structure of an inkjet recording apparatus according to an embodiment of the present invention is explained. A case where a treatment liquid contains highboiling-point solvent having a boiling point of 100° C. or more is explained below. The "non-aqueous solvent" means solvents other than water.

FIG. 1 is a general schematic drawing of an inkjet recording apparatus according to a first embodiment of the present invention. As illustrated in FIG. 1, the inkjet recording apparatus 1 according to the present embodiment is an inkjet recording apparatus using a drum-based direct printing method, which is one mode of a direct printing method of forming an image directly on a recording medium.

The inkjet recording apparatus 1 principally comprises, in order from the upstream side in terms of the direction of conveyance of a recording medium 22: a paper supply unit 10 which supplies recording media 22 (cut sheet paper); a treatment liquid deposition unit 12 which deposits a treatment liquid onto the recording surface of a recording medium 22 and dries the liquid; a print unit 14 which forms an image by depositing colored inks onto the recording surface of the recording medium 22; a drying unit 16 which dries the solvent of the colored inks; a fixing unit 18 which makes the image fix securely; and an output unit 20 which conveys and outputs the recording medium 22 on which an image has been formed. In this way, the inkjet recording apparatus 1 has a composition in which the respective image forming processes are disposed in respective units. A first intermediate conveyance unit 24 is provided between the treatment liquid deposition unit 12 and the print unit 14, a second intermediate conveyance unit 26 is provided between the print unit 14 and the drying unit 16, and a third intermediate conveyance unit 28 is provided between the drying unit 16 and the fixing unit 18.

Paper Supply Unit

The paper supply unit 10 is a mechanism which supplies recording media 22 to the treatment liquid deposition unit 12. A paper supply tray 50 is provided in the paper supply unit 10 and a recording medium 22 is supplied from the paper supply tray 50 to the treatment liquid deposition unit 12.

Treatment Liquid Deposition Unit

The treatment liquid deposition unit 12 has a mechanism which deposits onto the recording surface of the recording medium 22, a treatment liquid containing a coloring material aggregating agent which causes the coloring material contained in the ink to aggregate.

As illustrated in FIG. 1, the treatment liquid deposition unit 12 comprises a transfer drum 52 and a treatment liquid drum 54, and a treatment liquid application apparatus 56, a hot air blowing nozzle 58, and an infrared heater 60 are disposed at positions opposing the circumferential surface of the treatment liquid drum 54, in sequence from the upstream side in terms of the direction of rotation of the treatment liquid drum 54 (the counter-clockwise direction in FIG. 1).

The transfer drum 52 is a drum for receiving a recording medium 22 from the paper supply tray 50 of the paper supply unit 10 and transferring the recording medium 22 to the treatment liquid drum 54. It is also possible to provide an intermediate conveyance unit as described below, instead of the transfer drum 52.

The treatment liquid drum 54 is a drum for holding a recording medium 22 and conveying the medium by rotation. The treatment liquid application apparatus 56 is an apparatus for applying treatment liquid to the recording surface of the recording medium 22. The hot air blowing nozzle 58 and the infrared heater 60 are drying devices for drying the high-boiling-point solvent of the treatment liquid which has been applied to the recording surface of the recording medium 22.

The treatment liquid drum 54 holds the leading edge of the recording medium 22 by means of a hook-shaped holding device (a device similar to the holding device 73 in FIG. 4, which is described hereinafter) provided on the outer circumferential side of the drum. The treatment liquid drum 54 may also have suction holes provided in the outer circumferential side thereof, in order to hold the recording medium 22 in close contact by suctioning via the suction holes.

Figure 2:
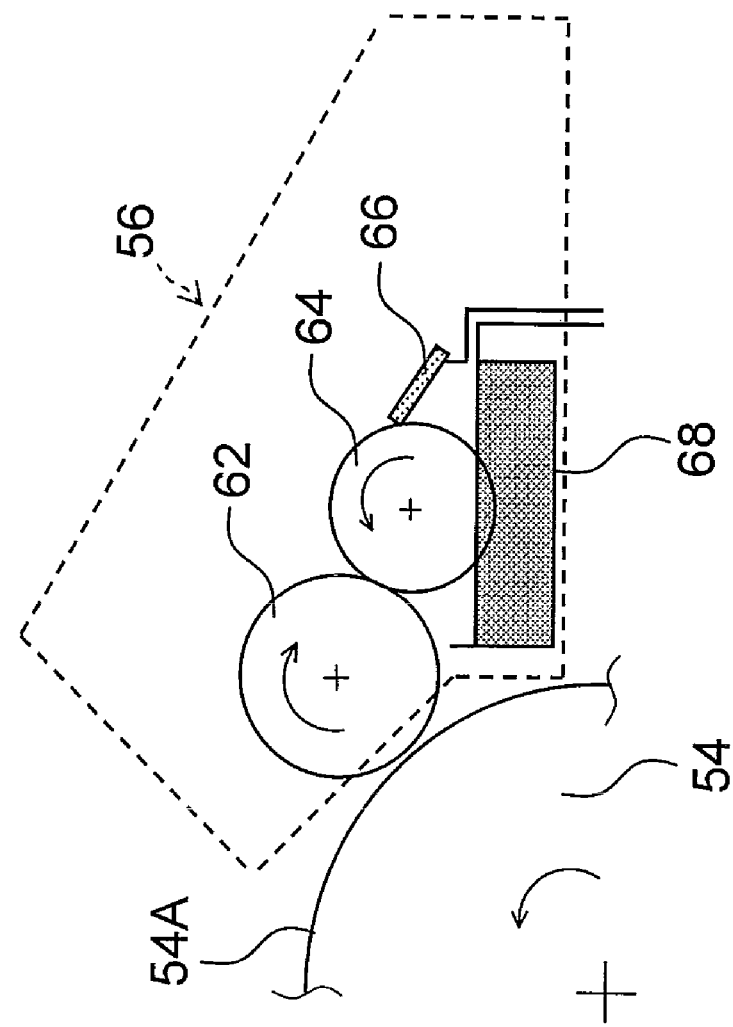
FIG. 2 is a schematic drawing of a treatment liquid application apparatus.

FIG. 2 is a schematic drawing of the treatment liquid application apparatus 56. As illustrated in FIG. 2, the treatment liquid application apparatus 56 comprises a rubber roller 62, an anilox roller 64, a squeegee 66, a treatment liquid container 68, and the like. The treatment liquid application apparatus 56 regulates the treatment liquid application volume by means of the anilox roller 64 which is partially immersed in the treatment liquid in the treatment liquid container 68, and the squeegee 66 which presses against the anilox roller 64. The rubber roller 62 which presses against the anilox roller 64 is pressed against the rotating treatment liquid drum 54 and is thereby driven to rotate at a prescribed uniform speed in the opposite direction to the direction of rotation of the treatment liquid drum 54 (the clockwise direction in FIG. 1), thus applying treatment liquid to the recording surface side of the recording medium 22.

Desirably, the thickness of the film of treatment liquid is sufficiently smaller than the diameter of the liquid droplets of ink which are ejected from the ink heads 72C, 72M, 72Y and 72K of the print unit 14 (see FIG. 1). For example, if the droplet ejection volume of the ink is 2 pl, then the average diameter of the liquid droplets is 15.6 μm. In this case, if the thickness of the film of treatment liquid is large, then the ink dots can float in the treatment liquid rather than making contact with the surface of the recording medium 22. Therefore, in order to obtain a deposited dot diameter of 30 μm or greater when the ink droplet ejection volume is 2 pl, it is desirable that the thickness of the film of treatment liquid should be 3 μm or less.

Figure 3:
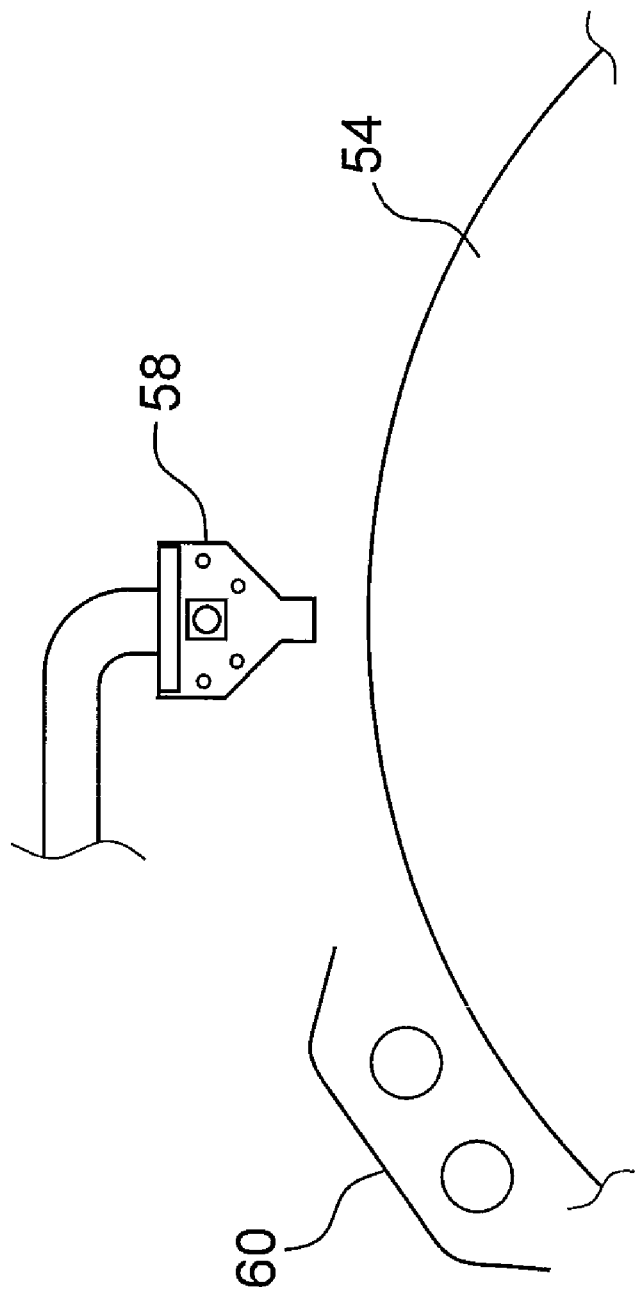
FIG. 3 is a diagram of the arrangement of a treatment liquid drum, a hot air blowing nozzle, and an infrared heater in a treatment liquid deposition unit.

FIG. 3 is a diagram illustrating the configuration of the hot air blowing nozzle 58 and the infrared heater 60. The hot air blowing nozzle 58 and the infrared heater 60 which are disposed about the treatment liquid drum 54 to the downstream side in terms of the direction of conveyance of the recording medium 22 are devices which dry the moisture content of the treatment liquid, and thereby form a solid layer or a thin film layer of treatment liquid on the recording surface of the recording medium 22. By forming a thin layer of treatment liquid in this way, when the ink dots formed by droplets ejected by the print unit 14 make contact with the recording surface of the recording medium 22, the required dot diameter is obtained, and furthermore, aggregation of the coloring material occurs due to reaction with the treatment liquid component that has been formed in a thin layer, and hence an action of fixing the coloring material to the recording surface of the recording medium 22 is readily achieved.

For example, the temperature of the treatment liquid drum 54 is set to 50° C., the temperature of the infrared heater 60 is set to 180° C., the temperature of the hot air from the hot air blowing nozzle 58 is set to 70° C., and the flow rate of the hot air from the hot air blowing nozzle 58 is set to 9 m³/minute.

Print Unit

Figure 4:
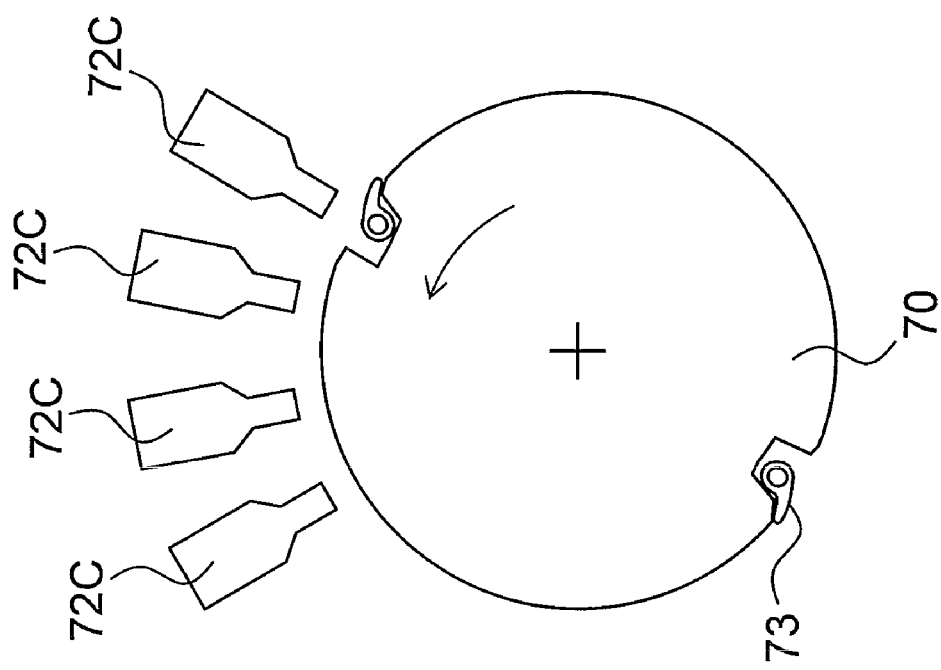
FIG. 4 is a schematic drawing of a print drum and an ink head.

As illustrated in FIG. 4, the print unit 14 comprises a print drum 70, and ink heads 72C, 72M, 72Y and 72K corresponding respectively to inks of the four colors of cyan (C), magenta (M), yellow (Y) and black (K) are disposed in close proximity at positions opposing the outer circumferential surface of the print drum 70, in the stated order from the upstream side in terms of the direction of rotation of the print drum 70 (the counter-clockwise direction in FIG. 4).

The print drum 70 is a drum which comprises, on the outer circumferential surface thereof, holding devices 73 for conveying the recording medium 22 in rotation by holding the leading edge of the recording medium 22 in the direction of conveyance of the medium. The ink heads 72C, 72M, 72Y and 72K are ink deposition devices which deposit ink onto the recording surface of the recording medium 22.

As illustrated in FIG. 4, the ink heads 72C, 72M, 72Y and 72K each have a length corresponding to the maximum width of the image forming region on the recording medium 22 which is disposed on the outer circumferential surface of the print drum 70. The ink heads 72C, 72M, 72Y and 72K are inkjet recording heads (inkjet heads) of a fall line type, which each have, formed in the ink ejection surface thereof, nozzle rows in which a plurality of nozzles for ejecting ink are arranged through the full width of the image forming region. The ink heads 72C, 72M, 72Y and 72K are fixed so as to extend in the direction perpendicular to the direction of conveyance of the recording medium 22 (the direction of rotation of the print drum 70).

These ink heads 72C, 72M, 72Y and 72K respectively eject liquid droplets of corresponding colored inks onto the recording surface of the recording medium 22 which is held on the outer circumferential surface of the print drum 70. In so doing, the coloring material (pigment) dispersed in the ink is caused to aggregate by the treatment liquid which has previously been deposited on the recording surface of the recording medium 22 by the treatment liquid deposition unit 12, thereby forming an aggregate of the coloring material in such a manner that a flow of coloring material, or the like, does not occur on the recording medium 22. In this way, an image is formed on the recording medium.

One conceivable example of a reaction between the ink and the treatment liquid uses a mechanism whereby the dispersion of the pigment is broken down and the pigment is caused to aggregate by a reduction in the pH resulting from the introduction of an acid into the treatment liquid, thereby preventing bleeding of the coloring material, color mixing between inks of the respective colors, and droplet ejection interference caused by combination of the liquid of the ink droplets upon landing on the medium.

Furthermore, the droplet ejection timing of the respective ink heads 72C, 72M, 72Y and 72K is synchronized with an encoder 91 (see FIG. 11) which is disposed on the print drum 70 and determines the speed of rotation. In this way, it is possible to determine the landing positions with good accuracy. Furthermore, speed variations caused by fluctuations in the print drum 70, or the like, are identified in advance, the droplet ejection timing obtained by the encoder 91 is corrected accordingly, and therefore non-uniformities in droplet ejection can be reduced, independently of fluctuations in the print drum 70, the accuracy of the rotational axle, or the speed of the outer circumferential surface of the print drum 70.

Moreover, a maintenance operation is carried out by withdrawing the head unit from the print drum 70, and cleaning the nozzle surfaces of the ink heads 72C, 72M, 72Y and 72K, expelling ink of increased viscosity, and so on.

Furthermore, although a configuration with the four standard colors of C, M, Y and K is described in the present embodiment, the combinations of the ink colors and the number of colors are not limited to those. Light and/or dark inks, and special color inks can be added as required. For example, a configuration is possible in which ink heads for ejecting light-colored inks, such as light cyan and light magenta, are added, and there is no particular restriction on the arrangement sequence of the heads of the respective colors. A more detailed description of the ink heads 72C, 72M, 72Y and 72K is given below.

The treatment liquid drum 54 of the treatment liquid deposition unit 12 and the print drum 70 of the print unit 14 are formed as separate structures, and therefore treatment liquid does not become attached to the ink heads 72C, 72M, 72Y and 72K, and it is possible to reduce the causes of ink ejection failures.

Drying Unit

Figure 5:
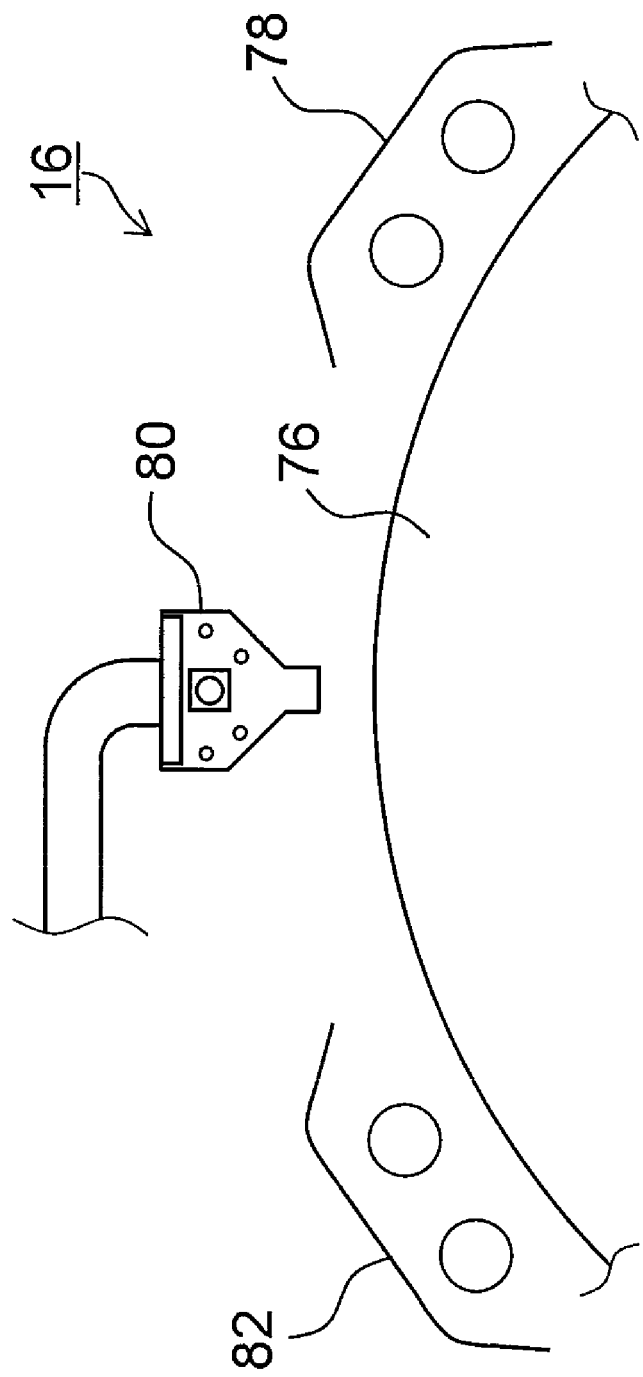
FIG. 5 is a diagram of the arrangement of a drying drum, a first infrared heater, a hot air blowing nozzle and a second infrared heater in a drying unit.

As illustrated in FIG. 1 above, the drying unit 16 comprises a drying drum 76, and as illustrated in FIG. 5, the drying unit 16 comprises a first infrared heater 78, a hot air blowing nozzle 80, and a second infrared heater 82 disposed in positions opposing the circumferential surface of the drying drum 76, in this order from the upstream side in terms of the direction of rotation of the drying drum 76 (the counter-clockwise direction in FIG. 1).

The second intermediate conveyance unit 26 is an intermediate conveyance unit for drying, and a conveyance device of transferring a recording medium 22 from the print drum 70 to the drying drum 76. The drying drum 76 is a drum for conveying the recording medium 22 in rotation while holding the recording medium 22 on the outer surface of the drying drum 76. The first infrared heater 78, the hot air blowing nozzle 80, and the second infrared heater 82 are drying devices for drying the liquid contained in the ink deposited to the recording medium 22.

The drying unit 16 performs a step of drying the moisture separated by the aggregating action of the coloring material, by evaporating off the moisture contained in the ink on the recording surface of the recording medium 22 held on the drying drum 76, by means of the first infrared heater 78, the hot air blowing nozzle 80 and the second infrared heater 82 illustrated in FIG. 5.

The drying drum 76 holds the leading edge of the recording medium 22 by means of a hook-shaped holding device (a device similar to the holding device 73 in FIG. 4) which is provided on the outer circumferential side of the drum. The drying drum 76 may also have suction holes provided in the outer circumferential side thereof, in order to hold the recording medium 22 in close contact by suctioning via the suction holes.

The temperature of the hot air emitted from the hot air blowing nozzle 80 is 50° C. to 70° C., and the evaporated moisture is expelled to the exterior of the apparatus together with the air, by an exhaust device which is not illustrated. It is also possible to cool the recovered air by means of a cooler (radiator), or the like, and to recover the moisture as a liquid.

For example, the temperature of the drying drum 76 is set to 60° C. or lower, the temperature of the first infrared heater 78 and the second infrared heater 82 is set to 180° C., the temperature of the hot air from the hot air blowing nozzle 80 is set to 70° C., and the flow rate of the hot air from the hot air blowing nozzle 80 is set to 12 $m^3$/minute.

The print drum 70 of the print unit 14 and the drying drum 76 of the drying unit 16 are formed by separate structures, and therefore it is possible to reduce the occurrence of ink ejection failures in the ink heads 72C, 72M, 72Y and 72K due to drying of the head maintenance unit by heat drying. Furthermore, the temperature of the drying unit 16 can be set freely and therefore an optimal drying temperature can be set.

Fixing Unit

Figure 6:
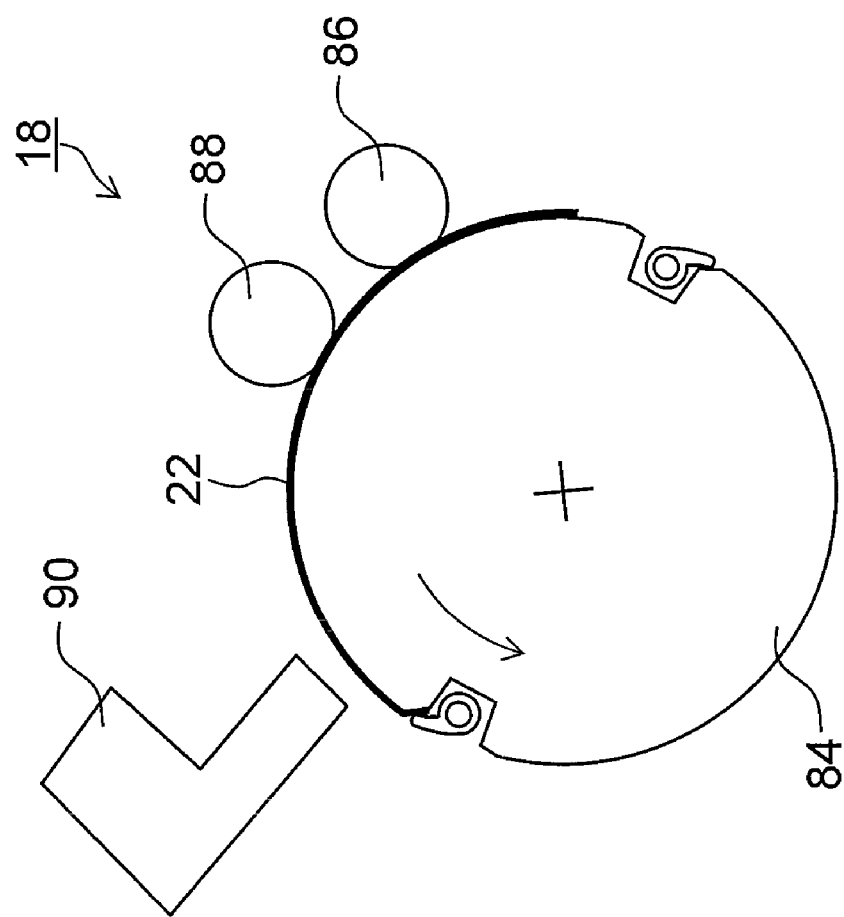
FIG. 6 is a diagram of the arrangement of a fixing drum, a first fixing roller, a second fixing roller and an in-line sensor in a fixing unit.

As illustrated in FIG. 1 above, the fixing unit 18 comprises a fixing drum 84, and as illustrated in FIG. 6, the fixing unit 18 comprises a first fixing roller 86, a second fixing roller 88 and an in-line sensor 90, disposed in positions opposing the circumferential surface of the fixing drum 84, in this order from the upstream side in terms of the direction of rotation of the fixing drum 84 (the counter-clockwise direction in FIG. 6).

The fixing unit 84 is a drum which holds and conveys in rotation a recording medium 22 on the outer circumferential surface thereof. The first fixing roller 86 and the second fixing roller 88 are roller members for fixing the image formed on the recording medium 22. The in-line sensor 90 is a measurement device for measuring a test pattern, the amount of moisture, the surface temperature, the luster, and the like, of the image fixed on the recording medium 22, and uses a CCD line sensor, or the like.

The fixing drum 84 holds the leading edge of the recording medium 22 by means of a hook-shaped holding device (a device similar to the holding device 73 in FIG. 4) which is provided on the outer circumferential side of the drum. The fixing drum 84 may also have suction holes provided on the outer circumferential side thereof, similarly to the suction holes 74 of the print drum 70 described above, in such a manner that the recording medium 22 is held in close contact with the drum by suctioning via the suction holes.

In the fixing unit 18, as illustrated in FIG. 6, the latex particles inside the thin image layer formed by the drying unit 16 on the recording surface of the recording medium 22 which is held on the fixing drum 84 are heated and pressurized by the first fixing roller 86 and the second fixing roller 88 and caused to melt, thereby fixing same to the recording medium 22.

The first fixing roller 86 and the second fixing roller 88 are heated rollers which incorporate a halogen lamp inside a metal pipe of aluminum, or the like, which has good thermal conductivity. By applying thermal energy equal to or greater than the Tg temperature (glass transition temperature) of the latex so as to melt the latex particles, the latex is pressed into the undulations in the recording medium 22 and fixed therein, and furthermore, the surface undulations of the image are leveled and a high luster can be obtained.

Furthermore, the first fixing roller 86 and the second fixing roller 88 form nip roller pairs with the fixing roller 84, and at least one of the pair of rollers has an elastic layer on the surface of the roller and thereby forms a uniform nip with respect to the recording medium 22.

Moreover, the first fixing roller 86 and the second fixing roller 88 may also be provided in a plurality of stages, depending on the thickness of the image layer and the Tg characteristics of the latex particles.

The temperature of the fixing drum 84 is set to 60° C., for example, the temperature of the first fixing roller 86 and the second fixing roller 88 is set to 60 to 80° C., and the nip pressure of the first fixing roller 86 and the second fixing roller 88 is set to 1 MPa.

Since the processes constituted by the fixing unit 18 and the other drums are separated in structural terms, then the temperature setting of the fixing unit 18 can be set freely and independently of the print unit 14 or the drying unit 16.

Output Unit

The output unit 20 is provided after the fixing unit 18. A transfer drum 94, a conveyance belt 96 and a tensioning roller 98 are provided between the fixing drum 84 of the fixing unit 18 and the output tray 92 of the output unit 20, so as to oppose same. The recording medium 22 is sent to the conveyance belt 96 by the transfer drum 94 and then output to the output tray 92.

Structure of the Ink Head

Next, the structure of an ink head will be described. The ink heads 72C, 72M, 72Y and 72K of the respective ink colors have the same structure, and a reference numeral 100 is hereinafter designated to any of the ink heads.

Figure 7A:
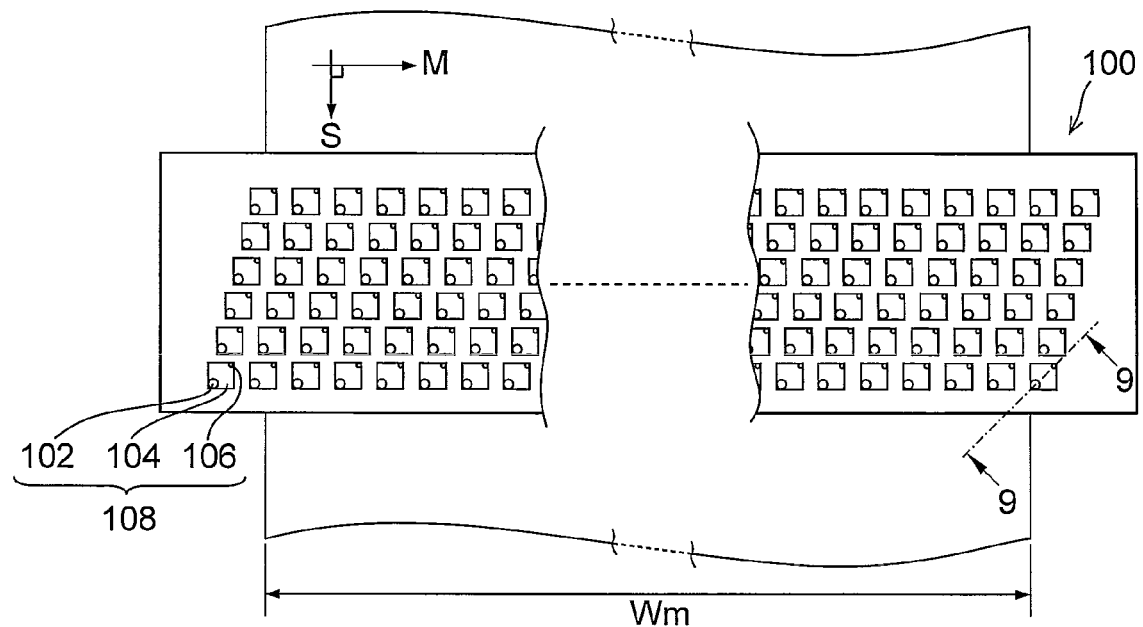
FIGS. 7A and 7B are plan view perspective diagrams illustrating the internal structure of a head.
Figure 7B:
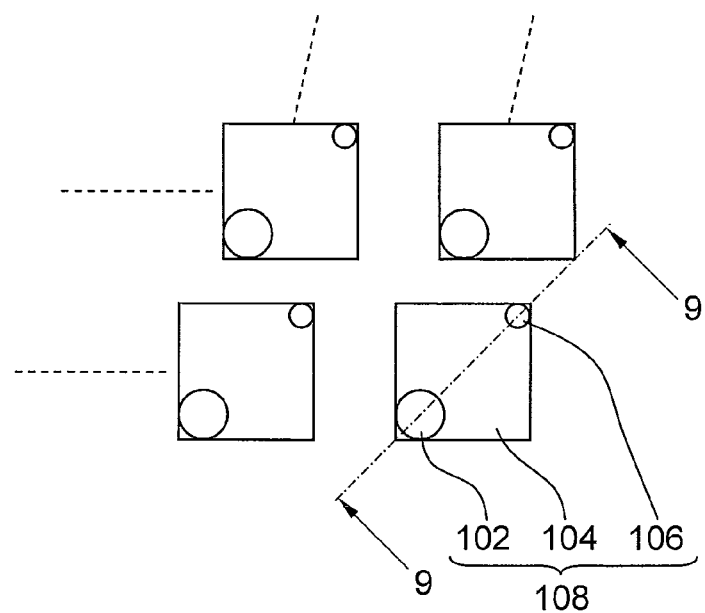

FIG. 7A is a perspective plan view illustrating an example of the configuration of the ink head 100, FIG. 7B is an enlarged view of a portion thereof. The nozzle pitch in the ink head 100 should be minimized in order to maximize the density of the dots printed on the surface of the recording medium 22. As illustrated in FIGS. 7A and 7B, the ink head 100 according to the present embodiment has a structure in which a plurality of ink chamber units (droplet ejection elements as recording element units) 108, each comprising a nozzle 102 forming an ink ejection port, a pressure chamber 104 corresponding to the nozzle 102, and the like, are disposed two-dimensionally in the form of a staggered matrix, and hence the effective nozzle interval (the projected nozzle pitch) as projected in the lengthwise direction of the head (the direction perpendicular to the conveyance direction of the recording medium 22) is reduced and high nozzle density is achieved.

The mode of composing one or more nozzle rows through a length corresponding to the full width of the image forming region of the recording medium 22 in the direction substantially perpendicular to conveyance direction of the recording medium 22 (arrow S in FIG. 7A), (in other words, in the direction indicated by arrow M in FIG. 7A), is not limited to the example illustrated in FIGS. 7A and 7B. For example, instead of the composition in FIG. 7A, as illustrated in FIG. 8, a line head having nozzle rows of a length corresponding to the entire width of the image forming region of the recording medium 22 can be formed by arranging and combining, in a staggered matrix, short head modules 100' each having a plurality of nozzles 102 arrayed in a two-dimensional fashion.

As illustrated in FIGS. 7A and 7B, the planar shape of the pressure chamber 104 provided corresponding to each nozzle 102 is substantially a square shape, and an outlet port to the nozzle 102 is provided at one of the ends of a diagonal line of the planar shape, while an inlet port (supply port) 106 for supplying ink is provided at the other end thereof. The shape of the pressure chamber 104 is not limited to that of the present example and various modes are possible in which the planar shape is a quadrilateral shape (diamond shape, rectangular shape, or the like), a pentagonal shape, a hexagonal shape, or other polygonal shape, or a circular shape, elliptical shape, or the like.

FIG. 9 is a cross-sectional diagram (along line 9-9 in FIGS. 7A and 7B) illustrating the composition of the liquid droplet ejection element of one channel which forms a recording element unit in the ink head 100 (an ink chamber unit corresponding to one nozzle 102).

As illustrated in FIG. 9, each pressure chamber 104 is connected to a common channel 110 through the supply port 106. The common channel 110 is connected to an ink tank (not illustrated), which is a base tank that supplies ink, and the ink supplied from the ink tank is supplied, through the common flow channel 110, to the pressure chambers 104.

An actuator 116 provided with an individual electrode 114 is bonded to a pressure plate (a diaphragm that also serves as a common electrode) 112 which forms the surface of one portion (in FIG. 9, the ceiling) of the pressure chambers 104. When a drive voltage is applied to the individual electrode 114 and the common electrode, the actuator 116 deforms, thereby changing the volume of the pressure chamber 104. This causes a pressure change which results in ink being ejected from the nozzle 102. For the actuator 116, it is possible to adopt a piezoelectric element using a piezoelectric body, such as lead zirconate titanate, barium titanate, or the like. When the displacement of the actuator 116 returns to its original position after ejecting ink, the pressure chamber 104 is replenished with new ink from the common flow channel 110, via the supply port 106.

By controlling the driving of the actuators 116 corresponding to the nozzles 102 in accordance with the dot data generated from the input image by a digital half-toning process, it is possible to eject ink droplets from the nozzles 102. By controlling the ink ejection timing of the nozzles 102 in accordance with the speed of conveyance of the recording medium 22, while conveying the recording medium 22 in the sub-scanning direction at a uniform speed, it is possible to record a desired image on the recording medium 22.

Figure 10:
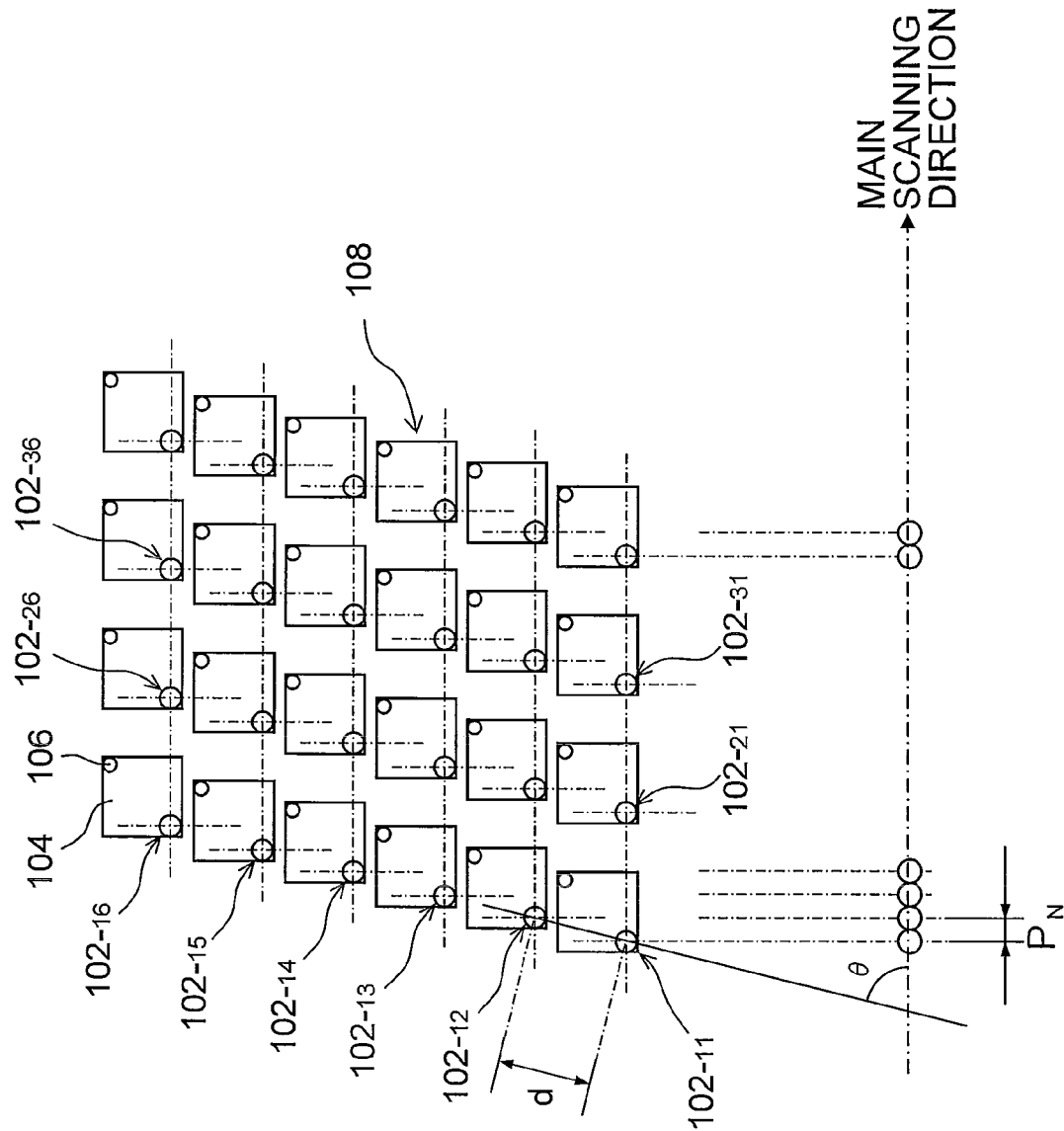
FIG. 10 is a plan diagram illustrating an example of the arrangement of nozzles in a head.

As illustrated in FIG. 10, the high-density nozzle head according to the present embodiment is achieved by arranging a plurality of ink chamber units 108 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 108 are arranged at a uniform pitch d in line with a direction forming an angle of θ with respect to the main scanning direction, the pitch $P_N$ of the nozzles projected (orthogonal projection) so as to align in the main scanning direction is d×cos θ, and hence the nozzles 102 can be regarded to be equivalent to those arranged linearly at a fixed pitch $P_N$ along the main scanning direction. By adopting a composition of this kind, it is possible to achieve higher density of the effective nozzles rows when the nozzles are projected to an alignment in the main scanning direction.

In a full-line head comprising rows of nozzles that have a length corresponding to the entire width of the image recordable width, the "main scanning" is defined as printing one line (a line formed of a row of dots, or a line formed of a plurality of rows of dots) in the direction perpendicular to the conveyance direction of the recording medium 22 by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 102 arranged in a matrix such as that illustrated in FIG. 10 are driven, the main scanning according to the above-described (3) is preferred. More specifically, the nozzles 102-11, 102-12, 102-13, 102-14, 102-15 and 102-16 are treated as a block (additionally; the nozzles 102-21, 102-22, . . . , 102-26 are treated as another block; the nozzles 102-31, 102-32, . . . , 102-36 are treated as another block; . . . ); and one line is printed in the direction perpendicular to the conveyance direction of the recording medium 22 by sequentially driving the nozzles 102-11, 102-12, . . . , 102-16 in accordance with the conveyance velocity of the recording medium 22.

On the other hand, "sub-scanning" is defined as to repeatedly perform printing of one line (a line formed of a row of dots, or a line formed of a plurality of rows of dots) formed by the main scanning, while moving the full-line head and the recording medium 22 relatively to each other.

The direction indicated by one line (or the lengthwise direction of a band-shaped region) recorded by the main scanning as described above is called the "main scanning direction", and the direction in which the sub-scanning is performed, is called the "sub-scanning direction". In other words, in the present embodiment, the conveyance direction of the recording medium 22 is called the sub-scanning direction and the direction perpendicular to same is called the main scanning direction. In implementing the present embodiment of the invention, the arrangement of the nozzles is not limited to that of the example illustrated.

Moreover, a method is employed in the present embodiment where an ink droplet is ejected by means of the deformation of the actuator 116, which is typically a piezoelectric element; however, in implementing the present embodiment of the invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Description of Control System

Figure 11:
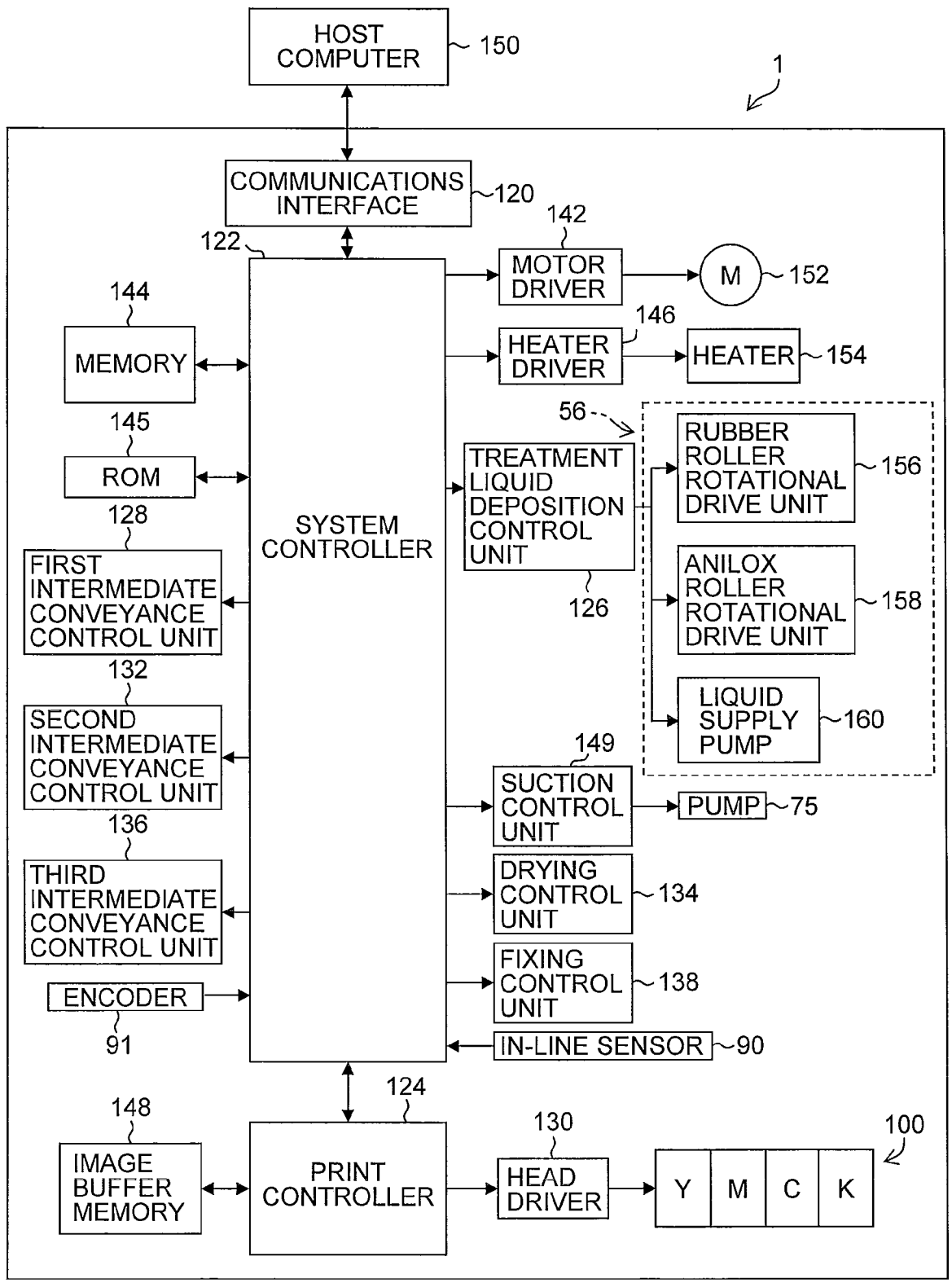
FIG. 11 is a principal block diagram illustrating the system composition of an inkjet recording apparatus.

FIG. 11 is a principal block diagram illustrating the system composition of the inkjet recording apparatus 1. The inkjet recording apparatus 1 comprises a communications interface 120, a system controller 122, a print controller 124, a treatment liquid deposition control unit 126, a first intermediate conveyance control unit 128, a head driver 130, a second intermediate conveyance control unit 132, a drying control unit 134, a third intermediate conveyance control unit 136, a fixing control unit 138, an in-line sensor 90, an encoder 91, a motor driver 142, a memory 144, a heater driver 146, an image buffer memory 148, a suction control unit 149, and the like.

The communications interface 120 is an interface unit for receiving image data sent from a host computer 150. A serial interface such as USB (Universal Serial Bus), IEEE1394, Ethernet (registered trademark), wireless network, or a parallel interface such as a Centronics interface may be used as the communications interface 120. A buffer memory (not illustrated) may be mounted in this portion in order to increase the communication speed. The image data sent from the host computer 150 is received by the inkjet recording apparatus 1 through the communications interface 120, and is temporarily stored in the memory 144.

The system controller 122 is constituted by a central processing unit (CPU) and peripheral circuits thereof, and the like, and functions as a control apparatus which controls the whole of the inkjet recording apparatus 1 in accordance with prescribed programs, as well as functioning as a calculation apparatus which carries out various calculations. In other words, the system controller 122 controls the respective sections such as the communications interface 120, the treatment liquid deposition control unit 126, the first intermediate conveyance control unit 128, the head driver 130, the second intermediate conveyance control unit 132, the drying control unit 134, the third intermediate conveyance control unit 136, the fixing control unit 138, the memory 144, the motor driver 142, the heater driver 146, the suction control unit 149, and the like, and controls communications with the host computer 150 and reading from and writing to the memory 144, and the like, as well as generating control signals for controlling the motor 152 of the conveyance system and the heater 154.

The memory 144 is a storage device which temporarily stores an image input via the communications interface 120, and data is read from and written to the image memory 144 via the system controller 122. The memory 144 is not limited to being a memory comprising a semiconductor element, and may also use a magnetic medium, such as a hard disk.

Programs executed by the CPU of the system controller 122 and the various types of data which are required for control procedures are stored in the ROM 145. The ROM 145 may be a non-writeable storage device, or it may be a rewriteable storage device, such as an EEPROM. The memory 144 is used as a temporary storage region for the image data, and it is also used as a program development region and a calculation work region for the CPU.

The motor driver 142 is a driver which drives the motor 152 in accordance with instructions from the system controller 122. In FIG. 11, the motors disposed in the respective sections in the apparatus are represented by the reference numeral 152. For example, the motor 152 illustrated in FIG. 11 includes motors that drive the rotation of the transfer drum 52, the treatment liquid drum 54, the print drum 70, the drying drum 76, the fixing drum 84, the transfer drum 94, and the like in FIG. 1, the drive motor of the pump 75 for creating a negative pressure suction via the suction holes 74 of the print drum 70, the motor of the withdrawal mechanism of the head unit of the ink heads 72C, 72M, 72Y, 72K, and so on.

The heater driver 146 is a driver which drives the heater 154 in accordance with instructions from the system controller 122. In FIG. 11, the plurality of heaters which are provided in the inkjet recording apparatus 1 are represented by the reference numeral 154. For example, the heater 154 illustrated in FIG. 11 includes a pre-heater (not illustrated) which heats the recording medium 22 previously to a suitable temperature in the paper supply unit 10.

The print controller 124 has a signal processing function for performing various tasks, compensations, and other types of processing for generating print control signals from the image data stored in the memory 144 in accordance with commands from the system controller 122 so as to supply the generated print data (dot data) to the head driver 130. Required signal processing is carried out in the print controller 124, and the ejection amount and the ejection timing of the ink droplets from the respective ink heads 100 are controlled via the head driver 130, on the basis of the print data. In this way, desired dot size and dot positions can be achieved.

The print controller 124 is provided with the image buffer memory 148; and image data, parameters, and other data are temporarily stored in the image buffer memory 148 when image data is processed in the print controller 124. The aspect illustrated in FIG. 11 is one in which the image buffer memory 148 accompanies the print controller 124; however, the memory 144 may also serve as the image buffer memory 148. Also possible is an aspect in which the print controller 124 and the system controller 122 are integrated to form a single processor.

To give a general description of the sequence of processing from image input to print output, image data to be printed (original image data) is input from an external source via the communications interface 120, and is accumulated in the memory 144. At this stage, RGB image data is stored in the memory 144, for example.

In this inkjet recording apparatus 1, an image which appears to have a continuous tonal graduation to the human eye is formed by changing the droplet ejection density and the dot size of fine dots created by ink (coloring material), and therefore, it is necessary to convert the input digital image into a dot pattern which reproduces the tonal gradations of the image (namely, the light and shade toning of the image) as faithfully as possible. Therefore, original image data (RGB data) stored in the memory 144 is sent to the print controller 124 through the system controller 122, and is converted to the dot data for each ink color by a half-toning technique, using a threshold value matrix, error diffusion, or the like, in the print controller 124.

In other words, the print controller 124 performs processing for converting the input RGB image data into dot data for the four colors of K, C, M and Y. The dot data generated by the print controller 124 in this way is stored in the image buffer memory 148.

The head driver 130 outputs drive signals for driving the actuators 116 corresponding to the respective nozzles 102 of the ink heads 100, on the basis of the print data supplied by the print controller 124 (in other words, the dot data stored in the image buffer memory 148). A feedback control system for maintaining constant drive conditions in the head may be included in the head driver 130.

By supplying the drive signals output by the head driver 130 to the ink heads 100, ink is ejected from the corresponding nozzles 102. An image is formed on the recording medium 22 by controlling ink ejection from the ink heads 100 while conveying the recording medium 22 at a prescribed speed.

Furthermore the system controller 122 controls the treatment liquid deposition control unit 126, the first intermediate conveyance control unit 128, the second intermediate conveyance control unit 132, the drying control unit 134, the third intermediate conveyance control unit 136, the fixing control unit 138 and the suction control unit 149.

The treatment liquid deposition control unit 126 controls the operation of the treatment liquid application apparatus 56 of the treatment liquid deposition unit 12, in accordance with instructions from the system controller 122. More specifically, in the treatment liquid application apparatus 56, a rubber roller rotation drive unit 156 which drives the rotation of the rubber roller 62, an anilox roller rotation drive unit 158 which drives the rotation of the anilox roller 64, and a liquid supply pump 160 which supplies treatment liquid to the treatment liquid container 68, and the like, are controlled by the treatment liquid deposition control unit 126.

The first intermediate conveyance control unit 128 controls the operation of the intermediate conveyance body 30 and the conveyance guide 32 of the first intermediate conveyance unit 24, in accordance with instructions from the system controller 122. More specifically, in the intermediate conveyance body 30, it controls the actual rotational driving of the intermediate conveyance body 30, the rotation of the holding device 34 provided on the intermediate conveyance body 30, and the driving of the blower 38, and the like. Furthermore, in the conveyance guide 32, it controls the operation of the pump 43 which performs a suctioning operation via the suction holes 42, and the like.

Figure 12:
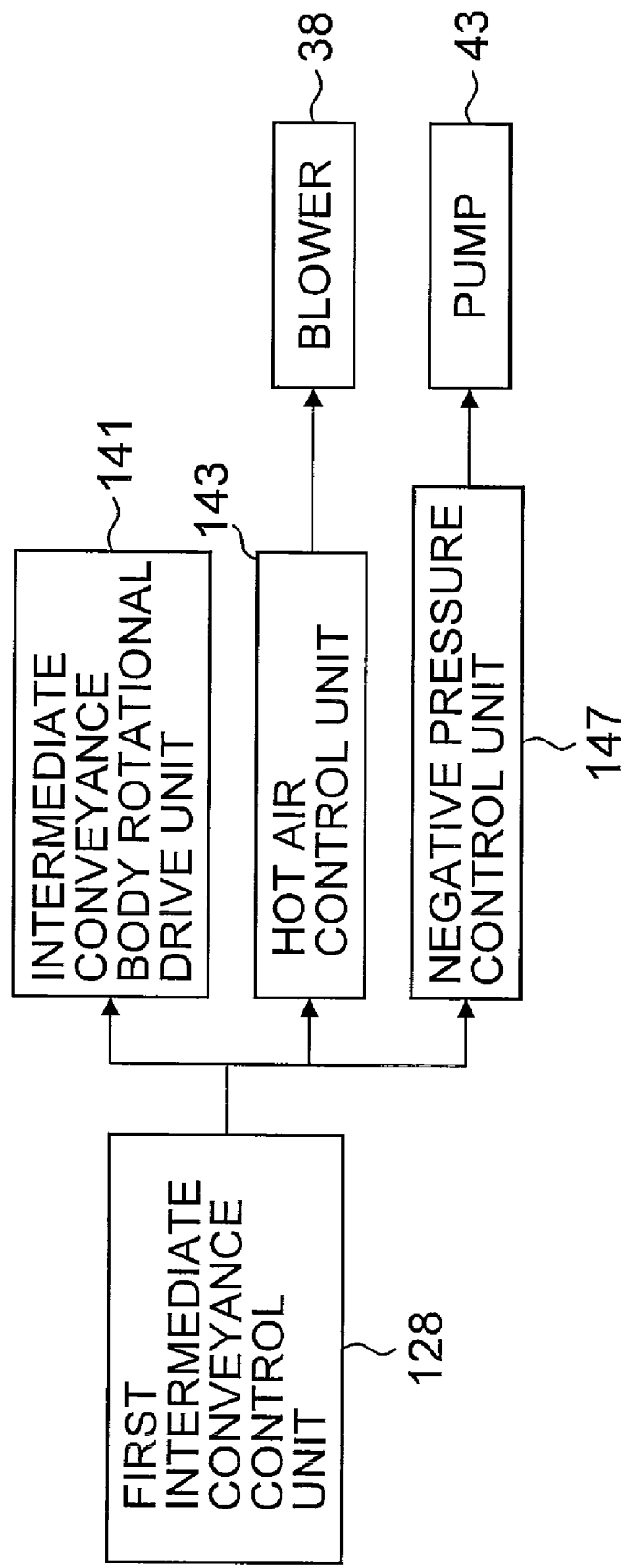
FIG. 12 is a principal block diagram illustrating the system composition of a first intermediate conveyance control unit.

FIG. 12 is a principal block diagram illustrating the system composition of the first intermediate conveyance control unit 128. As illustrated in FIG. 12, the first intermediate conveyance control unit 128 comprises an intermediate conveyance body rotational drive unit 141, an air blowing control unit 143, and a negative pressure control unit 147.

The rotational driving of the actual intermediate conveyance body 30 is controlled by the intermediate conveyance body rotational drive unit 141.

The air blowing control unit 143 is able to control and adjust the temperature and flow rate of the wind blown from the blower 38, so as to promote the efficient drying of the moisture contained in the treatment liquid and reduction of the viscosity of the high-boiling-point solvent. Furthermore, it is also possible to control the flow rate of the air blown from the blower 38 and to control the magnitude of the positive pressure created by the blown air, in accordance with the type of recording medium 22 (for example, the type such as high-quality paper or coat paper). Furthermore, it is also possible to control the temperature of the air blown from the blower 38 in accordance with the type of recording medium 22. Moreover, the air blowing control unit 143 may control the temperature of the wind blown from the air blowing apertures 36, in accordance with the amount of the high-boiling-point solvent in the treatment liquid and/or the ink deposited on the recording surface of the recording medium 22.

The pump 43 is controlled by the negative pressure control unit 147 to suction the recording medium 22 via the non-recording surface, which is the surface opposite to the recording surface, in such a manner that the solvent contained in the treatment liquid permeates through the recording medium. Furthermore, it is also possible to control the negative pressure applied by the pump 43 in such a manner that the pressure can be altered on the basis of at least one of the thickness of the recording medium 22 and the void ratio of the recording medium 22. Furthermore, it is also possible to control the magnitude of the negative pressure applied by the pump 43 in accordance with the type of recording medium 22.

The second intermediate conveyance control unit 132 and the third intermediate conveyance control unit 136 have a similar system structure to the first intermediate conveyance control unit 128, and respectively control the operations of the intermediate conveyance bodies 30 and conveyance guides 32 of the second intermediate conveyance unit 26 and the third intermediate conveyance unit 28.

The drying control unit 134 controls the operations of the first infrared heater 78, the hot air blowing nozzle 80 and the second infrared heater 82 in the drying unit 16, in accordance with instructions from the system controller 122.

The fixing control unit 138 controls the operations of the first fixing roller 86 and the second fixing roller 88 in the fixing unit 18 in accordance with instructions from the system controller 122.

The suction control unit 149 controls the operation of the pump 75 which is connected to the suction holes 74 of the print drum 70 in the print unit 14.

Furthermore, a test pattern applied to the recording medium 22, and a determination signal of measurement results data for the moisture content, surface temperature and luster, and other characteristics, of the recording medium 22, are also input to the system controller 122 from the in-line sensor 90. Moreover, a determination signal for the speed of rotation of the print drum 70 is input from the encoder 91 and the droplet ejection timing of the ink head 100 is duly controlled via the head driver 130.

Intermediate Conveyance Unit

Next, the structure of the intermediate conveyance units will be described.

The first intermediate conveyance unit 24 is a conveyance device for conveying the recording medium 22 from the treatment liquid drum 54 of the treatment liquid deposition unit 12 to the print drum 70 of the print unit 14. The second intermediate conveyance unit 26 is a conveyance device for conveying the recording medium 22 from the print drum 70 of the print unit 14 to the drying drum 76 of the drying unit 16. The third intermediate conveyance unit 28 is a conveyance device for conveying the recording medium 22 from the drying drum 76 of the drying unit 16 to the fixing drum 84 of the fixing unit 18.

The first intermediate conveyance unit 24, the second intermediate conveyance unit 26 and the third intermediate conveyance unit 28 share a similar structure, and therefore the first intermediate conveyance unit 24 is described here as a representative example.

Figure 13:
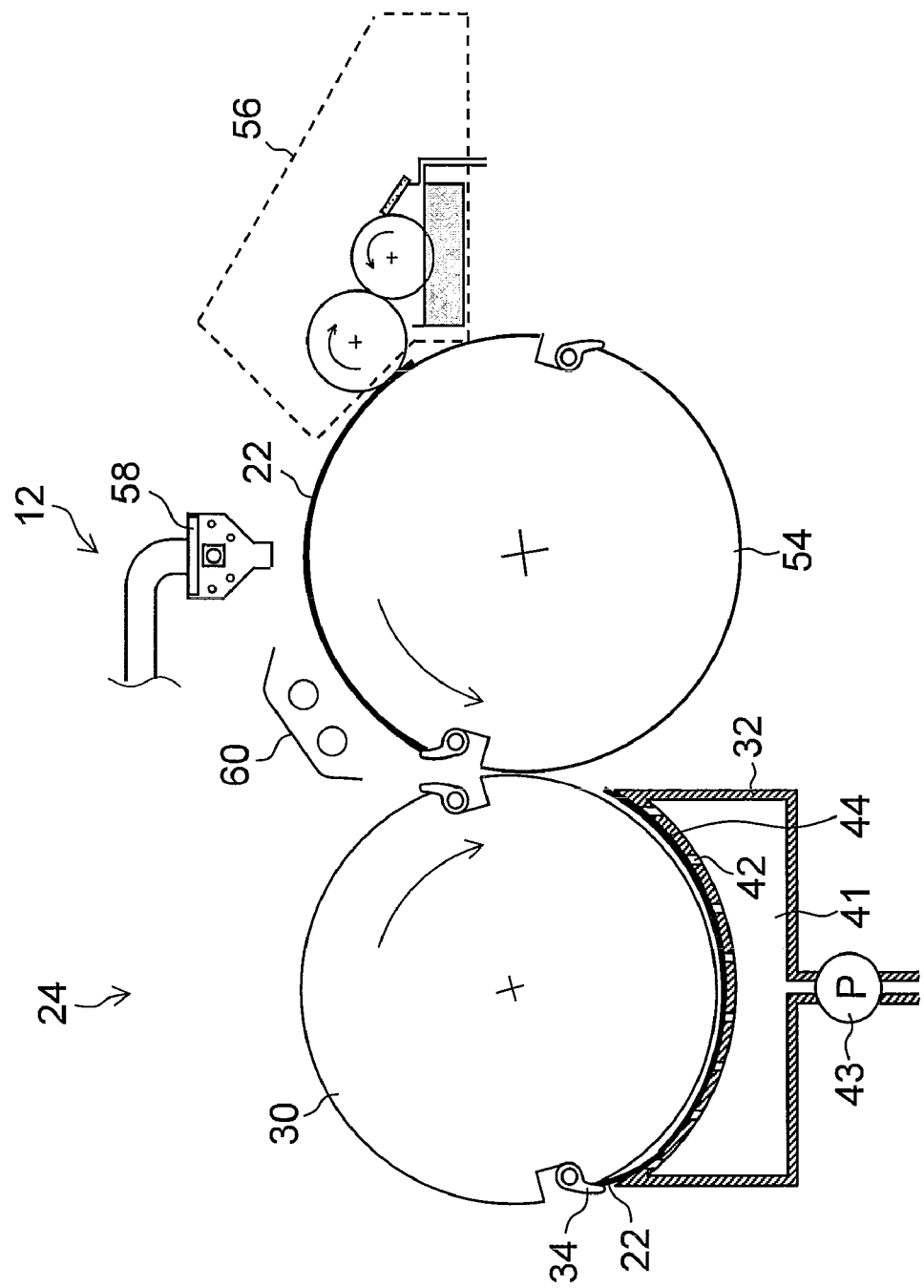
FIG. 13 is a diagram of a treatment liquid deposition unit and a first intermediate conveyance unit.

FIG. 13 illustrates the treatment liquid deposition unit 12 and the first intermediate conveyance unit 24.

As illustrated in FIG. 13, the first intermediate conveyance unit 24 mainly comprises the intermediate conveyance bodies 30 and conveyance guides 32.

The intermediate conveyance body 30 is a device which performs rotational conveyance of the recording medium transferred from the treatment liquid drum 54 of the treatment liquid deposition unit 12 while holding a leading edge of the recording medium 22, and transfers the recording medium 22 to the print drum 70. As illustrated in FIG. 13, the holding devices 34 having the shape of a nail for holding the leading edge of the recording medium are provided on the intermediate conveyance body 30. Although two holding devices 34 are provided at both ends (opposing ends) of the intermediate conveyance body 30 in the present embodiment illustrated in FIG. 13, the number of holding devices 34 are not limited to this.

Figure 14A:
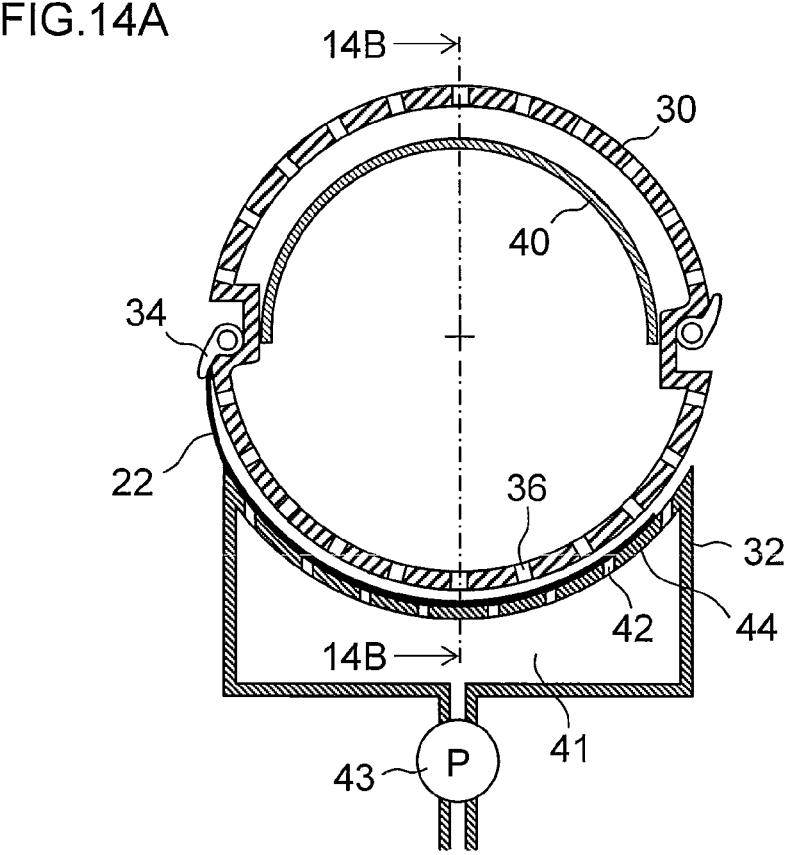
FIGS. 14A and 14B are cross-sectional diagrams of a first intermediate conveyance unit (in particular, FIG. 14B is a cross-sectional diagram along line 14B-14B in FIG. 14A)
Figure 14B:
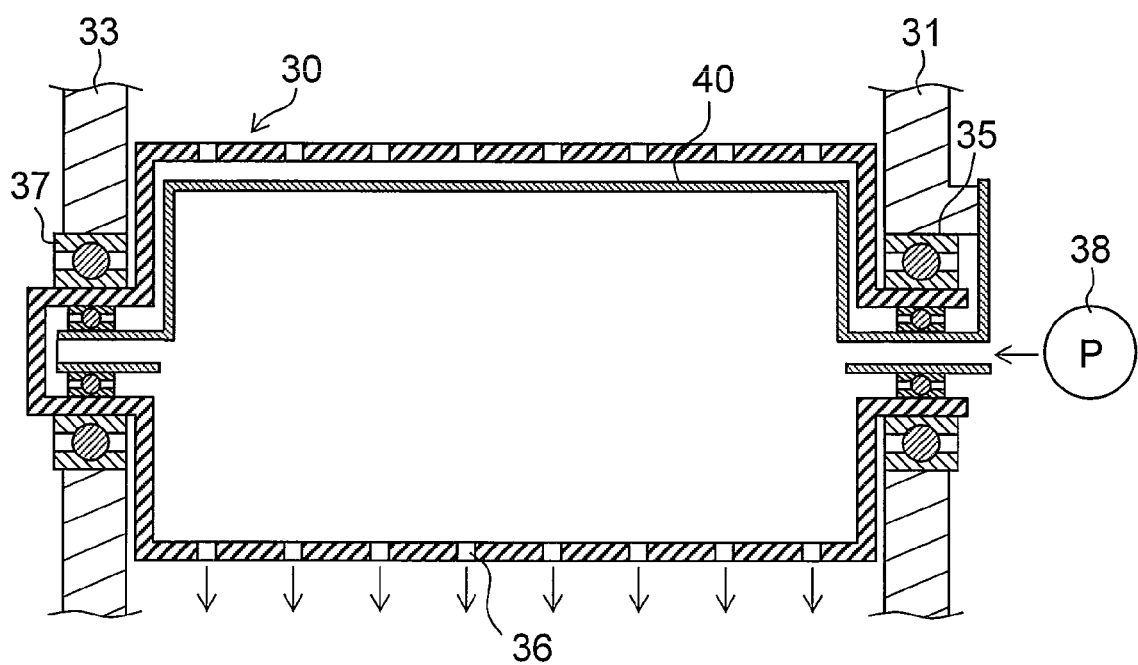

FIGS. 14A and 14B are cross-sectional diagrams of the first intermediate conveyance unit, and FIG. 14B is a cross-sectional view along line 14B-14B in FIG. 14A.

As illustrated in FIG. 14B, the intermediate conveyance body 30 is provided rotatably via bearings 35, 37 on frames 31 and 33 which are fixed at an interval apart in the breadthways direction of the conveyed recording medium 22 (the direction perpendicular to the direction of conveyance).

As illustrated in FIGS. 14A and 14B, a plurality of air blowing apertures 36 for blowing an air flow onto the recording surface of the recording medium 22 are formed in the surface of the intermediate conveyance body 30. The air blowing apertures 36 are connected to the blower 38 which forms an air blowing device for blowing a flow of air. The air flow which is blown from the blower 38 is set, for example, to a temperature of 70° C. and a flow volume of 1 m$^3$/minute. Furthermore, desirably, an air flow is blown in a virtually perpendicular fashion onto the recording surface of the recording medium 22, from the plurality of air blowing apertures 36.

Furthermore, as illustrated in FIGS. 14A and 14B, the intermediate conveyance body 30 internally comprises an air flow restriction guide 40 which partially restricts the air flow which is blown out from the air blowing apertures 36. The air flow restriction guide 40 is fixed to the frame 31, as illustrated in FIG. 14B. For example, in FIG. 14A, the recording medium 22 is held by the holding device 34 on the left-hand side of the drawing, and a state is depicted in which the recording medium 22 is positioned toward the conveyance guide 32 side with respect to the intermediate conveyance body 30. In this case, the air flow restricting guide 40 restricts the direction of the air flow in such a manner that an air flow is blown out from the air blowing apertures 36 which oppose the recording surface of the recording medium 22.

Furthermore, as illustrated in FIG. 4, the conveyance guide 32 is disposed in the vicinity of the intermediate conveyance body 30. The conveyance guide 32 is formed in a circular arc shape and guides the rotational movement of the recording medium 22 while applying a back tension to the surface of the recording medium 22 opposite to the recording surface (below, this is referred to as the "non-recording surface"). More specifically, the conveyance guide 32 comprises a guide surface 30a for guiding the conveyance of the recording medium 22, which is provided opposing the position where the holding devices 34 of the intermediate conveyance body 30 trace a circular arc-shaped path, and comprises a back tension application device which causes a force to act on the recording medium 22 in the direction opposite to the direction of rotation of the recording medium 22.

Furthermore, the guide surface 30a comprises a plurality of supporting sections 44 which support and guide the recording medium 22.

By means of the intermediate conveyance body 30 and the conveyance guide 32 which have the composition described above, the recording medium 22 is rotated and moved by means of the leading edge thereof being held by the holding device 34 of the intermediate conveyance body 30, while the non-recording surface is suctioned with a negative pressure by the pump 43, via the suction holes 42 in the guide surface 30a of the conveyance guide 32. Consequently, the recording medium 22 is moved in rotation while being supported and guided by the holding sections 44. Thereafter, the recording medium 22 is transferred to the holding device 73 of the print drum 70 from the holding device 34 of the intermediate conveyance body 30.

In the first intermediate conveyance unit 24 according to the present embodiment, when the recording medium 22 is moved in rotation by means of the intermediate conveyance body 30 holding the leading edge of the recording medium 22, the non-recording surface of the recording medium 22 is suctioned by suctioning via the suction holes 42 in the conveyance guide 32, and therefore the high-boiling-point solvent contained in the treatment liquid which has been deposited on the recording surface of the recording medium 22 permeates into the recording medium 22. Therefore, when ink droplets are ejected in the print unit 14 in the subsequent stage, no high-boiling-point solvent is present on the surface of the recording medium 22 and therefore the coloring material in the liquid droplets of ink does not flow and the quality of the image is improved.

When the non-recording surface of the recording medium 22 is suctioned, the negative pressure applied by the pump 43 via the suction holes 42 can be controlled by the negative pressure control unit 147 of the control system (see FIG. 12) so as to be variable on the basis of at least one of the specifications of the recording medium 22, such as the thickness of the recording medium 22, the porosity of the recording medium 22, the type of recording medium 22, and so on. More specifically, in order to promote the permeation of the solvent into the recording medium 22, the greater the thickness of the recording medium 22, the higher the negative pressure set to be applied by the pump 43 via the suction holes 42. Furthermore, the smaller the porosity of the recording medium 22, the greater the negative pressure set to be applied by the pump 43 via the suction holes 42.

Moreover, by blowing an air flow onto the recording surface of the recording medium 22 onto which treatment liquid has been deposited, from the air blowing apertures 36 in the intermediate conveyance body 30, the permeation into the recording medium 22 of the high-boiling-point solvent in the treatment liquid which has been deposited on the recording surface of the recording medium 22 is promoted. Moreover, by blowing hot air onto the recording surface of the recording medium 22 on which treatment liquid has been deposited, from the air blowing apertures 36 of the intermediate conveyance body 30, the viscosity of the high-boiling-point solvent in the treatment liquid is lowered and the permeation thereof into the recording medium 22 is promoted, and also the residual moisture in the treatment liquid is also dried.

Here, Table 1 illustrates the evaluation results of the viscosity characteristics of a high-boiling-point solvent with respect to the temperature of the liquid, in the case of a liquid which contains a high-boiling-point solvent. Table 1 illustrates the evaluation results obtained when the content ratio of the high-boiling-point solvent was set to five different values and the temperature of the liquid was set to three different values. The unit of viscosity was InPa·s (cP).

TABLE 1

| | | Content of high-boiling-point solvent wt %: Weight percent | | | | |
|---|---|---|---|---|---|---|
| | | 100 wt % | 90 wt % | 67 wt % | 50 wt % | 33 wt % |
| Temperature of liquid | 25° C. | 507 mPa·s | 264 mPa·s | 33.9 mPa·s | 10.85 mPa·s | 4.146 mPa·s |
| | 40° C. | 246 mPa·s | 101.8 mPa·s | 16.14 mPa·s | 5.196 mPa·s | 2.58 mPa·s |
| | 60° C. | 82.44 mPa·s | 33.72 mPa·s | 7.308 mPa·s | 3.204 mPa·s | 1.56 mPa·s |

As illustrated in Table 1, the viscosity of the high-boiling-point solvent tends to become lower, the higher the temperature of the liquid, and therefore it is possible to promote permeation into the recording medium 22 by raising the temperature of the treatment liquid and ink through blowing hot air via the air blowing apertures 36 and thus reducing the viscosity of the high-boiling-point solvent in the treatment liquid or ink.

Therefore, as described above, the viscosity of the high-boiling-point solvent of the treatment liquid is lowered, thereby promoting the permeation of the solvent into the recording medium 22 by blowing hot air onto the recording surface of the recording medium 22 on which treatment liquid has been deposited from the air blowing apertures 36 of the intermediate conveyance body 30.

Furthermore, as illustrated in Table 1, the greater the content of the high-boiling-point solvent, the higher the viscosity. Therefore, by controlling the temperature of the air flow blown from the air blowing apertures 36 of the intermediate conveyance body 30 on the basis of the content of the high-boiling-point solvent in the treatment liquid, it is possible to control the permeation of the solvent into the recording medium 22. More specifically, the temperature of the air flow blown by the blower 38 is controlled by the air flow control unit 143 of the control system (see FIG. 12) in accordance with the content of the high-boiling-point solvent of the treatment liquid, in such a manner that the reduction in the viscosity of the high-boiling-point solvent is promoted in an efficient manner. More specifically, it can be seen that the greater the content of the high-boiling-point solvent in the treatment liquid, the higher the temperature to which the air flow from the blower 38 is adjusted by the air blowing control unit 143 of the control system.

Image Forming Method

Next, an image forming method using the inkjet recording apparatus according to the present embodiment will be described. FIGS. 16A to 16H are a schematic diagram illustrating an image forming method using an inkjet recording apparatus.

Figure 16A:
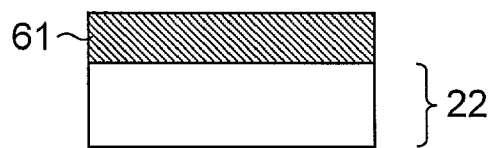
FIGS. 16A to 16H are illustrative diagrams of an image forming method.

As illustrated in FIG. 16A, the treatment liquid 61 is applied at a uniform film thickness onto the recording medium 22 which is held in close contact on the treatment liquid drum 54, by the treatment liquid application apparatus 56.

Figure 16B:
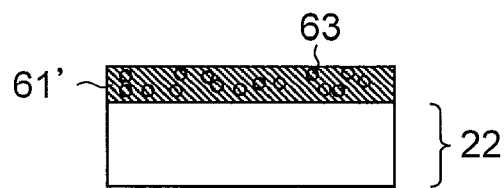

Next, as illustrated in FIG. 16B, the water content of the treatment liquid 61 on the recording medium 22 is dried by the hot air blowing nozzle 58 and the infrared heater 60, thereby forming a solid or semi-solid aggregating treatment liquid layer 61' and precipitating (separating) an acid 63. By forming the aggregating treatment liquid layer 61' through drying the water content of the treatment liquid 61 in this way, it is possible to prevent curling of the recording medium 22.

Reference here to "aggregating treatment agent layer in a solid state or a semi-solid state" includes a layer having a liquid content (water content) of 0% to 70% as defined below.

Liquid Content(water content)=Weight per unit surface area of water contained in treatment liquid after drying (g/m²)/Weight per unit surface area of treatment liquid after drying (g/m²)   Expression 1

Figure 16C:
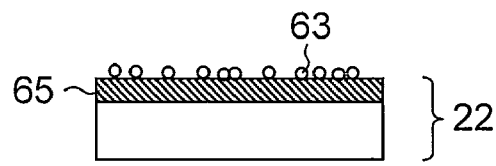

Next, in the first intermediate conveyance unit 24, a negative pressure is applied to the non-recording surface of the recording medium 22 via the suction holes 42 of the conveyance guide 32 and an air flow is blown onto the recording surface of the recording medium 22 from the air blowing apertures 36 of the intermediate conveyance body 30. Consequently, as illustrated in FIG. 16C, the high-boiling-point solvent 65 in the treatment liquid 61 permeates into the recording medium 22 and ceases to be present on the surface of the recording medium 22, and the acid 63 precipitates on the surface of the solvent.

If hot air is blown onto the recording surface of the recording medium 22 from the air blowing apertures 36 of the intermediate conveyance body 30, the viscosity of the high-boiling-point solvent 65 in the treatment liquid 61 is lowered, thereby promoting permeation into the recording medium 22, and furthermore the water content which may remain in the treatment liquid 61 can be dried off. Furthermore, if the temperature of the air flow blown from the air blowing apertures 36 is controlled by the air blowing control unit 143 in accordance with the volume of high-boiling-point solvent deposited on the recording surface of the recording medium 22, then the viscosity of the high-boiling-point solvent is lowered and the permeation of same into the recording medium 22 is promoted.

Furthermore, by restricting the direction of the air flow using an air flow restriction guide 40 in such a manner that an air flow is blown from the air blowing apertures 36 which oppose the recording surface of the recording medium 22, the permeation into the recording medium 22 of the high-boiling-point solvent of the treatment liquid on the recording surface of the recording medium 22 is promoted in a more reliable fashion.

Furthermore, by controlling the pressure applied to the recording medium 22 through controlling the blower 38 and the pump 43 in accordance with the type of the recording medium 22, by means of the air blowing control unit 143 and the negative pressure control unit 147, it is possible to achieve compatibility with the general characteristics of the recording medium 22.

Moreover, if the pressure applied to the recording medium 22 is controlled by means of the air blowing control unit 143 and the negative pressure control unit 147 in accordance with at least one of the thickness of the recording medium 22 and the porosity of the recording medium 22, then it is possible to achieve compatibility with the general characteristics of the recording medium 22.

Figure 16D:
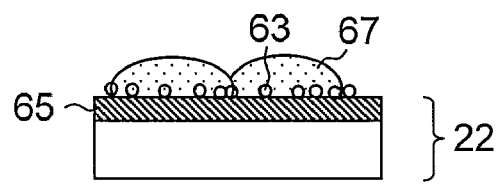

Next, as illustrated in FIG. 16D, the ink 67 is ejected onto the recording medium 22 from the ink heads 72C, 72M, 72Y and 72K.

Here, when the ink 67 is ejected, no high-boiling-point solvent 65 is present on the surface of the recording medium 22 and therefore the coloring material in the ink does not flow and the quality of the image is improved.

Figure 16E:
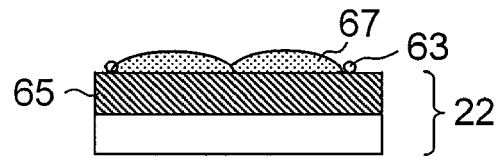

Thereupon, when hot air is blown onto the recording surface of the recording medium 22 from the air blowing apertures 36 of the intermediate conveyance body 30 in the second intermediate conveyance unit 26, then as illustrated in FIG. 16E, the water content of the ink 67 is dried and furthermore the viscosity of the high-boiling-point solvent 65 in the ink 67 is lowered and permeation into the recording medium 22 is promoted. The high-boiling-point solvent 65 in the ink 67 is a non-aqueous solvent which has a boiling point of 100° C. or higher.

Here, the print drum 70 does not comprise a device for drying the water content of the ink 67, in order to prevent ejection failures in the ink heads 72C, 72M, 72Y and 72K due to drying. In the second intermediate conveyance unit 26, the water content of the ink 67 is dried. By drying the water content in the ink 67 in this way, it is possible to prevent curling of the recording medium 22 or deterioration of image quality.

Moreover, in the second intermediate conveyance unit 26, a negative pressure is applied to the non-recording surface of the recording medium 22 via the suction holes 42 of the conveyance guide 32. In this way, as illustrated in FIG. 16E, the high-boiling-point solvent 65 in the ink 67 is caused to permeate into the recording medium 22.

Furthermore, by blowing hot air onto the recording surface of the recording medium 22 from the air blowing apertures 36 of the intermediate conveyance body 30, the viscosity of the high-boiling-point solvent 65 in the liquid droplets of ink 67 is lowered and permeation into the recording medium 22 is further promoted. Furthermore, if the temperature of the air flow blown from the air blowing apertures 36 is controlled by the air blowing control unit 143 in accordance with the volume of high-boiling-point solvent deposited on the recording surface of the recording medium 22, then the viscosity of the high-boiling-point solvent is lowered and the permeation of same into the recording medium 22 is promoted.

Furthermore, by restricting the direction of the air flow using the air flow restriction guide 40 in such a manner that an air flow is blown from the air blowing apertures 36 which oppose the recording surface of the recording medium 22, the permeation into the recording medium 22 of the high-boiling-point solvent of the ink on the recording surface of the recording medium 22 is promoted in a more reliable fashion.

Furthermore, by controlling the pressure applied to the recording medium 22 through controlling the blower 38 and the pump 43 in accordance with the type of the recording medium 22, by means of the air blowing control unit 143 and the negative pressure control unit 147, it is possible to achieve compatibility with the general characteristics of the recording medium 22.

Moreover, if the pressure applied to the recording medium 22 is controlled by means of the air blowing control unit 143 and the negative pressure control unit 147 in accordance with at least one of the thickness of the recording medium 22 and the porosity of the recording medium 22, then it is possible to achieve compatibility with the general characteristics of the recording medium 22.

Figure 16F:
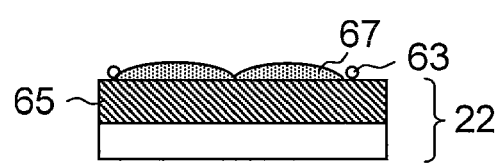

Next, the water content of the ink 67 on the recording medium 22 is dried by means of the first infrared heater 78, the hot air blowing nozzle 80 and the second infrared heater 82, as illustrated in FIG. 16F. Here, since the water convent of the ink 67 has previously been dried in the second intermediate conveyance unit 26, then it is possible to dry off virtually all of the water content in the ink 67 on the drying drum 76.

Figure 16G:
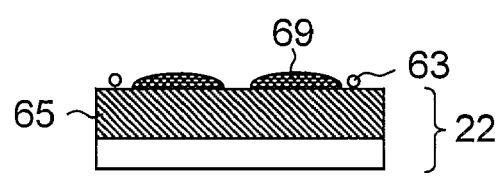

Next, in the third intermediate conveyance unit 28, a negative pressure is applied to the non-recording surface of the recording medium 22 via the suction holes 42 of the conveyance guide 32 and an air flow is blown onto the recording surface of the recording medium 22 from the air blowing apertures 36 of the intermediate conveyance body 30. In this way, as illustrated in FIG. 16G, the high-boiling-point solvent 65 in the liquid ink droplets 67 permeates sufficiently into the recording medium 22, and an aggregate of coloring material 69 is formed on the recording medium 22.

In the third intermediate conveyance unit 28, if hot air is blown onto the recording surface of the recording medium 22 from the air blowing apertures 36 of the intermediate conveyance body 30, the viscosity of the high-boiling-point solvent 65 in the liquid droplets of ink 67 is lowered, thereby promoting the permeation thereof into the recording medium 22, and furthermore the water content which may remain in the liquid ink droplets 67 can be dried off. Furthermore, if the temperature of the air flow blown from the air blowing apertures 36 is controlled by the air blowing control unit 143 in accordance with the volume of high-boiling-point solvent deposited on the recording surface of the recording medium 22, then the viscosity of the high-boiling-point solvent is lowered and the permeation of same into the recording medium 22 is promoted.

Furthermore, by restricting the direction of the air flow using the air flow restriction guide 40 in such a manner that an air flow is blown from the air blowing apertures 36 which oppose the recording surface of the recording medium 22, the permeation into the recording medium 22 of the high-boiling-point solvent of the ink on the recording surface of the recording medium 22 is promoted in a more reliable fashion.

Furthermore, by controlling the pressure applied to the recording medium 22 through controlling the blower 38 and the pump 43 in accordance with the type of the recording medium 22, by means of the air blowing control unit 143 and the negative pressure control unit 147, it is possible to achieve compatibility with the general characteristics of the recording medium 22.

Moreover, if the pressure applied to the recording medium 22 is controlled by means of the air blowing control unit 143 and the negative pressure control unit 147 in accordance with at least one of the thickness of the recording medium 22 and the porosity of the recording medium 22, then it is possible to achieve compatibility with the general characteristics of the recording medium 22.

Figure 16H:
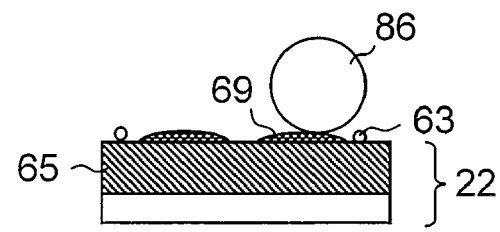

Thereupon, the image is fixed onto the recording medium 22 by means of the fixing rollers 86 and 88, on the fixing drum 84, as illustrated in FIG. 16H. Here, since no high-boiling-point solvent 65 is present on the surface of the recording medium 22 when the image is fixed by means of the fixing rollers 86 and 88, then the image fixing properties are improved and image quality is enhanced.

Beneficial Effects of First Embodiment

In the inkjet recording apparatus 1 according to the first embodiment, since the conveyance guide 32 of the first intermediate conveyance unit 24 applies a negative pressure to the non-recording surface of the recording medium 22 which is moved in rotation by the intermediate conveyance body 30, then it is possible to promote the permeation of the high-boiling-point solvent of the treatment liquid on the recording surface of the recording medium 22. Accordingly, when ink 67 is ejected, no high-boiling-point solvent 65 is present on the surface of the recording medium 22 and therefore the coloring material in the ink 67 does not flow and the quality of the image is improved. The high-boiling-point solvent is a non-aqueous solvent having a boiling point of 100° C. or above.

Furthermore, since the conveyance guides 32 of the second intermediate conveyance unit 26 and the third intermediate conveyance unit 28 apply a negative pressure to the non-recording surface of the recording medium 22 which is moved in rotation by the intermediate conveyance body 30, then it is possible to promote the permeation of the high-boiling-point solvent of the ink on the recording surface of the recording medium 22. Consequently, since no high-boiling-point solvent is present on the surface of the recording medium 22 when the image is fixed on the recording medium 22 by the fixing rollers 86 and 88 on the fixing drum 84, then the image fixing properties are improved and image quality is enhanced.

Moreover, in the first intermediate conveyance unit 24, if an air flow is blown onto the recording surface of the recording medium 22 from the air blowing apertures 36 of the intermediate conveyance unit 30, then it is possible further to promote the permeation into the recording medium 22 of the high-boiling-point solvent of the treatment liquid on the recording surface of the recording medium 22.

Moreover, in the second intermediate conveyance unit 26 and the third intermediate conveyance unit 28, by blowing an air flow onto the recording surface of the recording medium 22 from the air blowing apertures 36 of the intermediate conveyance units 30, it is possible further to promote the permeation into the recording medium 22 of the high-boiling-point solvent of the ink on the recording surface of the recording medium 22.

Furthermore, in the first intermediate conveyance unit 24, the second intermediate conveyance unit 26 and the third intermediate conveyance unit 28, by restricting the direction of the air flow using the air flow restriction guide 40 in such a manner that an air flow is blown from the air blowing apertures 36 which oppose the recording surface of the recording medium 22, the permeation into the recording medium 22 of the high-boiling-point solvent of the treatment liquid or ink on the recording surface of the recording medium 22 is promoted in a more reliable fashion.

Moreover, in the first intermediate conveyance unit 24, the second intermediate conveyance unit 26 and the third intermediate conveyance unit 28, if the temperature of the air flow blown from the air blowing apertures 36 is controlled by the air blowing control unit 143 in accordance with the volume of high-boiling-point solvent deposited on the recording surface of the recording medium 22, then the viscosity of the high-boiling-point solvent is lowered and the permeation into the recording medium 22 is promoted.

Furthermore, by controlling the pressure applied to the recording medium 22 through controlling the blower 38 and the pump 43 in accordance with the type of the recording medium 22, by means of the air blowing control unit 143 and the negative pressure control unit 147, it is possible to achieve compatibility with the general characteristics of the recording medium 22.

Moreover, if the pressure applied to the recording medium 22 is controlled by means of the air blowing control unit 143 and the negative pressure control unit 147 in accordance with at least one of the thickness of the recording medium 22 and the porosity of the recording medium 22, then it is possible to achieve compatibility with the general characteristics of the recording medium 22.

In the embodiments described above, the treatment liquid includes a high-boiling-point solvent which is a non-aqueous solvent having a boiling point of 100° C. or higher, but also in cases where the treatment liquid includes a non-aqueous solvent other than a high-boiling-point solvent, similar beneficial effects are brought about.

More specifically, since the conveyance guide 32 applies a negative pressure to the non-recording surface of the recording medium 22 which moves in rotation by means of the intermediate conveyance body 30, then it is possible to promote the permeation of the non-aqueous solvent other than a high-boiling-point solvent in the treatment liquid on the recording surface of the recording medium 22. Accordingly, when ink 67 is ejected, no non-aqueous solvent is present on the surface of the recording medium 22 and therefore the coloring material in the ink 67 does not flow and the quality of the image is improved. Furthermore, it is possible to promote the permeation of the non-aqueous solvent other than a high-boiling-point solvent in the ink on the recording surface of the recording medium 22. Consequently, since no non-aqueous solvent is present on the surface of the recording medium 22 when the image is fixed on the recording medium 22 by the fixing rollers 86 and 88 on the fixing drum 84, then the image fixing properties are improved and image quality is enhanced.

Furthermore, since the intermediate conveyance body 30 blows an air flow onto the recording surface of the recording medium 22 which is moved in rotation, then it is possible to promote the permeation of the non-aqueous solvent other than a high-boiling-point solvent in the treatment liquid on the recording surface of the recording medium 22. Moreover, it is also possible to promote the permeation of the non-aqueous solvent other than a high-boiling-point solvent in the ink on the recording surface of the recording medium 22.

Other Beneficial Effects

The recording medium 22 is conveyed while being supported by the supporting sections 44 due to the non-recording surface being suctioned onto the guide surface 30a by suctioning from the suction holes 42 of the conveyance guide 32 and by an air flow emitted from the air blowing apertures 36 of the intermediate conveyance body 30, and the recording surface of the recording medium 22 is conveyed without making contact with the constituent members such as the intermediate conveyance body 30 and the conveyance guide 32.

Furthermore, when the recording medium 22 is conveyed in close contact by means of the leading edge of the recording medium 22 being held by the holding device 73 of the print drum 70, the holding device of the drying drum 76 or the holding device of the fixing drum 84, a back tension acts on the trailing edge of the recording medium 22 due to suctioning via the suction holes 42 of the conveyance guide 32 or due to an air flow emitted from air blowing apertures 36 of the intermediate conveyance body 30, and therefore wrinkling and floating up of the recording medium 22 does not occur.

It is possible to control the negative pressure or positive pressure by means of the negative pressure control unit 147 or the air blowing control unit 143, in accordance with the type of the recording medium 22. Apart from this, the back tension application device may also be constituted by the supporting sections 44 which have a large coefficient of friction on the surface thereof. More specifically, such a device may be constituted by the supporting sections 44 having an increased surface roughness or the supporting sections 44 having a surface made of a material such as rubber. In this way, it is possible to achieve similar beneficial effects to a case where suction is applied.

Figure 15:
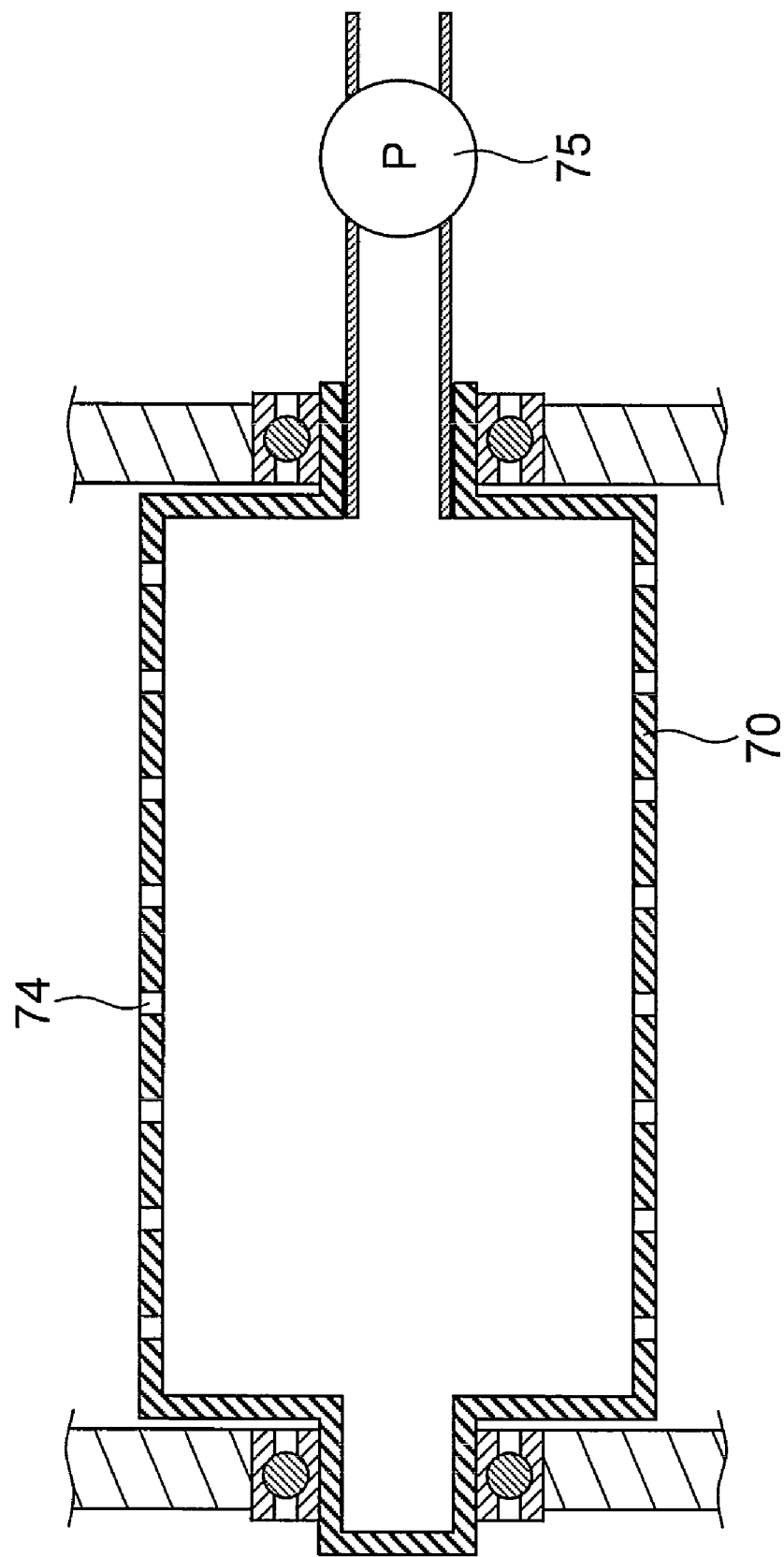
FIG. 15 is a cross-sectional diagram of a print drum.

FIG. 15 is a cross-sectional diagram of the vicinity of the print drum 70 when viewed in the breadthways direction of the recording medium 22 (the direction perpendicular to the direction of conveyance of the recording medium 22). As illustrated in FIG. 15, suction holes 74 for suctioning with a negative pressure which are connected to the pump 75 are provided in the outer circumferential side of the print drum 70. Consequently, when the recording medium 22 is conveyed in close contact with the print drum 70, the leading edge of the recording medium 22 is suctioned and held on the print drum 70, while a back tension acts on the trailing edge of the recording medium 22 in the first intermediate conveyance unit 24. In the drying drum 76 and the fixing drum 84, similar beneficial effects can be obtained by providing suction holes in a similar fashion.

Modification Example

Figure 17:
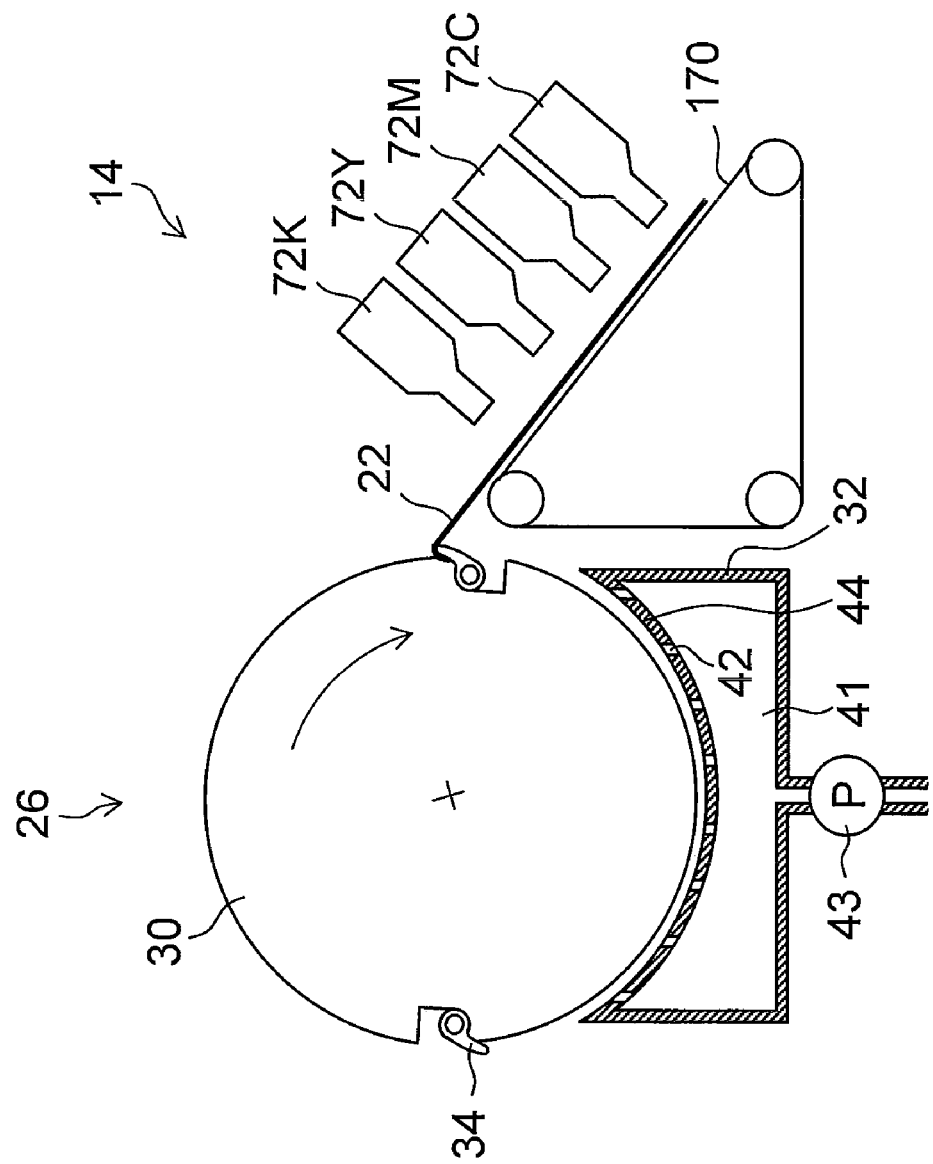
FIG. 17 is a diagram illustrating an example where a conveyance belt is used instead of a print drum.
Figure 18:
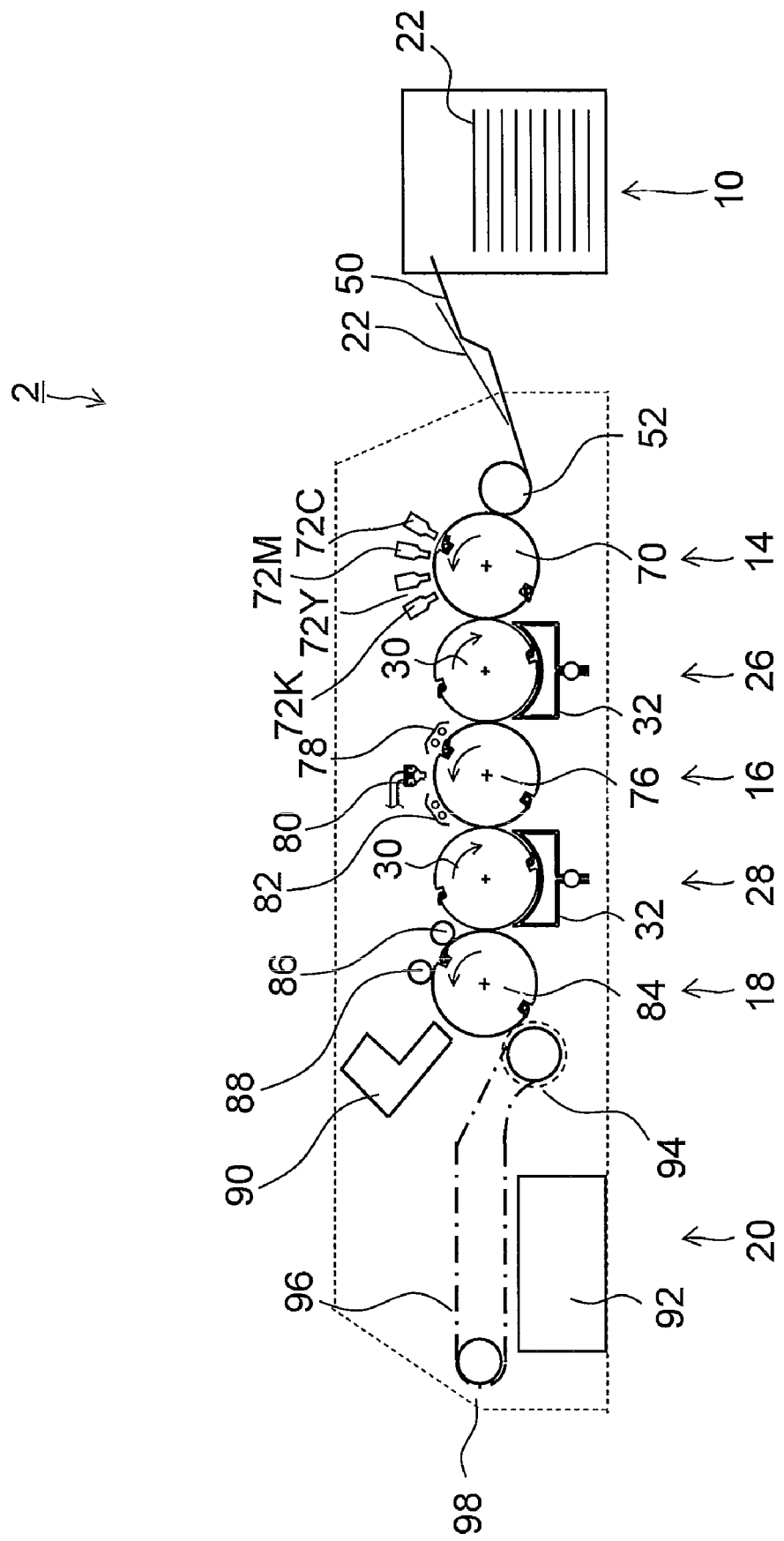
FIG. 18 is a general schematic drawing of an inkjet recording apparatus according to a second embodiment.

In a modification of the first embodiment, an example is envisaged in which all or a portion of the conveyance drums (treatment liquid drum 54, print drum 70, drying drum 76, and fixing drum 84) of the inkjet recording apparatus 1 according to the first embodiment are changed to belt devices. FIG. 17 is a diagram which illustrates an example where a conveyance belt 170 is used instead of the print drum 70 in the print unit 14 of the inkjet apparatus 1. In the conveyance belt 170 illustrated in FIG. 17, the recording medium 22 is conveyed by suction. In a modification example of this kind, it is also possible to obtain similar beneficial effects to those of the inkjet apparatus 1 described above.

More specifically, the apparatus comprises: ink heads 72C, 72M, 72Y and 72K which deposit ink onto the recording surface of the recording medium 22 which is conveyed on the conveyance belt 170, an intermediate conveyance body 30 which rotates and moves the recording medium 22 by gripping the leading edge of the recording medium 22 onto which ink has been deposited on the recording surface thereof by the ink heads 72C, 72M, 72Y and 72K, and a conveyance guide 32 which guides the non-recording surface of the recording medium 22 which is moved in rotation by the intermediate conveyance body 30, and since the conveyance guide 32 applies a negative pressure to the non-recording surface of the recording medium 22 which is moved in rotation by the intermediate conveyance body 30, it is possible to promote the permeation into the recording medium 22 of the high-boiling-point solvent in the ink on the recording surface. Consequently, since no high-boiling-point solvent is present on the surface of the recording medium 22 when the image is fixed on the recording medium 22 by the fixing rollers 86 and 88 on the fixing drum 84 or conveyance belt (not illustrated), then the image fixing properties are improved and image quality is enhanced.

Furthermore, the apparatus comprises: a treatment liquid application apparatus 56 which deposits treatment liquid onto the recording surface of the recording medium 22 which is conveyed on a conveyance belt (not illustrated), an intermediate conveyance body 30 which rotates and moves the recording medium 22 by gripping the leading edge of the recording medium 22 onto which treatment liquid has been deposited on the recording surface thereof by the treatment liquid application apparatus 56, and a conveyance guide 32 which guides the non-recording surface of the recording medium 22 which is moved in rotation by the intermediate conveyance body 30, and since the conveyance guide 32 applies a negative pressure to the non-recording surface of the recording medium 22 which is moved in rotation by the intermediate conveyance body 30, it is possible to promote the permeation into the recording medium 22 of the high-boiling-point solvent in the treatment liquid on the recording surface. Accordingly, when ink 67 is ejected on the print drum 70 on the conveyance belt 170, no high-boiling-point solvent 65 is present on the surface of the recording medium 22 and therefore the coloring material in the ink 67 does not flow and the quality of the image is improved.

Second Embodiment

As a second modification, an inkjet recording apparatus 2 which uses special paper as a recording medium 22 will be described. The special paper is a paper which has previously undergone a treatment which promotes the aggregation of the coloring material (pigment) and latex particles contained in the deposited ink so as to separate the coloring material and the solvent of the ink.

The inkjet recording apparatus 2 according to the second embodiment differs from the inkjet recording apparatus 1 according to the first embodiment in that it does not comprise the treatment liquid deposition unit 12 and the first intermediate conveyance unit 24. FIG. 16 illustrates a general schematic drawing of the inkjet recording apparatus 2 according to the second embodiment. The remainder of the composition is the same as that of the inkjet recording apparatus 1 according to the first embodiment.

Moreover, in the second intermediate conveyance unit 26 and the third intermediate conveyance unit 28, by carrying out suctioning via suction holes 42 in the conveyance guide 32, the non-recording surface of the special paper is suctioned, and thereby the high-boiling-point solvent contained in the ink that has been deposited in the print unit 14 is caused to permeate into the special paper. Consequently, when the image is fixed by fixing rollers 86 and 88 in the fixing unit 18 provided in a subsequent stage, since no high-boiling-point solvent is present on the surface of the recording medium 22, the image fixing properties are improved and the image quality is improved.

When the non-recording surface of the special paper is suctioned, the negative pressure applied by the pump 43 via the suction holes 42 can be controlled by the negative pressure control unit 147 of the control system (see FIG. 12) so as to be variable on the basis of at least one of the thickness of the special paper and the void ratio of the special paper. More specifically, the greater the thickness of the special paper, the higher the negative pressure set to be applied by the pump 43 via the suction holes 42 in order to promote the permeation of the solvent into the special paper. Furthermore, the smaller the void ratio of the special paper, the higher the negative pressure set to be applied by the pump 43 via the suction holes 42 in order to promote the permeation of the solvent into the special paper.

Moreover, in the second intermediate conveyance unit 26 and the third intermediate conveyance unit 28, by blowing hot air onto the recording surface of the special paper via air blowing apertures 36 in the intermediate conveyance body 30, the viscosity of the high-boiling-point solvent in the ink is lowered, thereby promoting its permeation into the recording medium 22, as well as promoting the drying of the residual water content in the ink.

The temperature and flow rate of the air flow from the blower 38 can be adjusted and controlled by the air flow control unit 143 of the control system (see FIG. 12), in such a manner that the reduction in the viscosity of the high-boiling-point solvent in the ink and the drying of the residual water content are promoted in an efficient fashion.

Inkjet recording apparatuses and inkjet recording methods according to embodiments of the present invention have been described in detail above, but the present invention is not limited to the aforementioned examples, and it is of course possible for improvements or modifications of various kinds to be implemented, within a range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An inkjet recording apparatus which ejects an ink so as to record an image on a recording medium, the inkjet recording apparatus comprising:
    a conveyance device which conveys a recording medium;
    a liquid deposition device which deposits a liquid onto a recording surface of the recording medium which is conveyed by the conveyance device;
    an intermediate conveyance body which moves the recording medium in rotation onto the recording surface of which the liquid has been deposited by the liquid deposition device while holding an edge of the recording medium with a holding device; and
    a conveyance guide for guiding a non-recording surface of the recording medium which is moved in rotation by the intermediate conveyance body
    wherein the conveyance guide has:
    a guide surface which guides the non-recording surface of the recording medium moved by the intermediate conveyance body and is provided opposing a position where the holding device of the intermediate conveyance body traces a circular arc-shaped path;
    suction holes provided across a whole of the guide surface;
    a chamber connected to the suction holes; and
    a pump for suctioning to create a negative pressure in the chamber, and
    wherein the non-recording surface of the recording medium moved by the intermediate conveyance body is suctioned with a negative pressure via the suction holes while being guided by the guide surface in such a manner that a negative pressure is provided to the non-recording surface of the recording medium.

2. The inkjet recording apparatus as defined in claim 1, comprising a negative pressure control device which controls the negative pressure applied by the suctioning by the pump.

3. The inkjet recording apparatus as defined in claim 1, further comprising a positive pressure application device which is provided in the intermediate conveyance body and applies a positive pressure to the recording surface of the recording medium.

4. The inkjet recording apparatus as defined in 1, wherein the liquid deposition device is a treatment liquid deposition device which deposits a treatment liquid onto the recording surface of the recording medium which is conveyed by the conveyance device.

5. The inkjet recording apparatus as defined in claim 1, wherein the liquid deposition device is an inkjet head which deposits the ink onto the recording surface of the recording medium which is conveyed by the conveyance device.

6. The inkjet recording apparatus as defined in claim 1, wherein the liquid deposited onto the recording surface of the recording medium by the liquid deposition device contains a high-boiling-point solvent.

7. The inkjet recording apparatus as defined in claim 2, wherein the negative pressure control device controls the negative pressure in accordance with a type of the recording medium.

8. The inkjet recording apparatus as defined in claim 2, wherein the negative pressure control device controls the negative pressure in accordance with at least one of a thickness of the recording medium and a porosity of the recording medium.

9. The inkjet recording apparatus as defined in claim 3, comprising a positive pressure control device which controls the positive pressure applied by the positive pressure application device.

10. The inkjet recording apparatus as defined in claim 3, wherein the positive pressure application device comprises a positive pressure restricting device which partially restricts the positive pressure applied to the recording surface of the recording medium.

11. The inkjet recording apparatus as defined in claim 3, wherein the positive pressure application device comprises an air blowing aperture which blows an air flow onto the recording surface of the recording medium.

12. The inkjet recording apparatus as defined in claim 3, wherein the liquid deposited onto the recording surface of the recording medium by the liquid deposition device contains a high-boiling-point solvent.

13. The inkjet recording apparatus as defined in claim 9, wherein the positive pressure control device controls the positive pressure in accordance with a type of the recording medium.

14. The inkjet recording apparatus as defined in claim 9, wherein the positive pressure control device controls the positive pressure in accordance with at least one of a thickness of the recording medium and a porosity of the recording medium.

15. The inkjet recording apparatus as defined in claim 11, wherein the positive pressure control device controls at least one of a temperature and a flow rate of the air flow blown from the air blowing aperture in accordance with an amount of high-boiling-point solvent which has been deposited onto the recording surface of the recording medium.

* * * * *